US010268007B2

(12) United States Patent
Son et al.

(10) Patent No.: US 10,268,007 B2
(45) Date of Patent: Apr. 23, 2019

(54) OPTICAL TRANSMITTING DEVICE INCLUDING FIRST LENS AND REFLECTOR MOUNTED TO HOUSING BODY AND SECOND LENS MOUNTED TO HOUSING COVER

(71) Applicant: OPTOMIND INC., Suwon-si (KR)

(72) Inventors: Yung-sung Son, Yongin (KR); Bong-cheol Kim, Seoul (KR); Sang-sin Lee, Seoul (KR); Yong-geon Lee, Seoul (KR)

(73) Assignee: OPTOMIND INC. (KR)

( * ) Notice: Subject to any disclaimer, the term of this patent is extended or adjusted under 35 U.S.C. 154(b) by 0 days.

(21) Appl. No.: 16/008,774

(22) Filed: Jun. 14, 2018

(65) Prior Publication Data

US 2018/0299630 A1   Oct. 18, 2018

Related U.S. Application Data

(63) Continuation of application No. PCT/KR2016/014737, filed on Dec. 15, 2016.

(30) Foreign Application Priority Data

Dec. 15, 2015 (KR) .......................... 10-2015-0179014
Dec. 15, 2015 (KR) .......................... 10-2015-0179030

(51) Int. Cl.
*G02B 6/42* (2006.01)
*H04B 10/50* (2013.01)
(Continued)

(52) U.S. Cl.
CPC ............. *G02B 6/4261* (2013.01); *G02B 6/42* (2013.01); *G02B 6/4214* (2013.01); *G02B 6/4244* (2013.01); *G02B 6/4255* (2013.01); *H04B 10/50* (2013.01); *H04B 10/60* (2013.01); *H04B 10/80* (2013.01); *G02B 6/4253* (2013.01)

(58) Field of Classification Search
CPC .. G02B 6/4261; G02B 6/4214; G02B 6/4244; G02B 6/4255; G02B 6/4253; H04B 10/50
See application file for complete search history.

(56) References Cited

U.S. PATENT DOCUMENTS 8,575,529 B2 * 11/2013 Asahi .................. G02B 6/4201
                                                                    250/205
9,103,984 B2 *  8/2015 Son ..................... G02B 6/4214
(Continued)

FOREIGN PATENT DOCUMENTS

JP       1998-167749      6/1998
JP       2008158473 A     7/2008
(Continued)

*Primary Examiner* — Akm E Ullah
(74) *Attorney, Agent, or Firm* — Harness, Dickey & Pierce, P.L.C.

(57) ABSTRACT

Embodiments according to the present disclosure relate to an optical transmitting device and an optical receiving device which can minimize the alignment error between the light source and the photodetector on the substrate, miniaturize the devices, and require no separate guide member reducing manufacturing costs, while satisfying the design requirements for sub-miniaturization, and performing optical transmission and reception more efficiently.

9 Claims, 13 Drawing Sheets

(51) Int. Cl.
*H04B 10/60* (2013.01)
*H04B 10/80* (2013.01)

(56) References Cited

U.S. PATENT DOCUMENTS

| | | | |
|---|---|---|---|
| 9,507,105 B2 * | 11/2016 | Son | G02B 6/4214 |
| 9,632,262 B2 * | 4/2017 | Aihara | G02B 6/32 |
| 9,645,331 B1 * | 5/2017 | Kim | G02B 6/4243 |
| 9,739,957 B2 * | 8/2017 | Son | G02B 6/4214 |
| 2004/0022487 A1 * | 2/2004 | Nagasaka | G02B 6/4204 |
| | | | 385/31 |
| 2011/0123151 A1 * | 5/2011 | Zbinden | G02B 6/4214 |
| | | | 385/33 |
| 2014/0346323 A1 * | 11/2014 | Fujimura | G01J 1/44 |
| | | | 250/208.2 |

FOREIGN PATENT DOCUMENTS

| | | |
|---|---|---|
| JP | 2013-235243 A | 11/2013 |
| KR | 20090040365 A | 4/2009 |
| KR | 20120029673 A | 3/2012 |
| KR | 10-1502318 B1 | 3/2015 |
| KR | 20160064540 A | 6/2016 |

* cited by examiner

OPTICAL TRANSMITTING DEVICE INCLUDING FIRST LENS AND REFLECTOR MOUNTED TO HOUSING BODY AND SECOND LENS MOUNTED TO HOUSING COVER

CROSS-REFERENCE TO RELATED APPLICATIONS

The present application is a continuation of International Application No. PCT/KR2016/014737, filed Dec. 15, 2016, which is based upon and claims the benefit of priorities from Korean Patent Application Nos. 10-2015-0179014 and 10-2015-0179030, both filed on Dec. 15, 2015. The disclosures of the above-listed applications are hereby incorporated by reference herein in their entireties.

BACKGROUND OF THE INVENTION

Technical Field

The present disclosure in some embodiments relates to an optical transmitting device and an optical receiving device for an optical fiber cable and a method of aligning thereof.

Discussion

The statements in this section merely provide background information related to the present disclosure and do not necessarily constitute prior art.

Optical fiber-based signal transmission methods, which are in extensive use for a long haul communication, have widespread applications in a large-capacity digital media transmission including a high-definition digital video display for which high-speed and high-density data transmission is required, owing to the operation characteristics unaffected by an electromagnetic interference (EMI) and usefulness in a broad bandwidth of the optical fiber.

These optical fiber-based signal transmission methods can be implemented by arranging a lens and a reflector configured between an optical fiber and an optical element. One possible way to achieve such configuration is to install the optical fiber and a structure affixed with the reflector and the lens on a substrate mounted with the optical element to establish an optical alignment.

This method of optical alignment can be incorporated into manufacturing an optical transceiver, where a selected way of aligning the optical element, the lens, the reflector and the optical fiber dictates the structural simplification, manufacturing cost reduction, and durability and precision enhancements, etc., which exhibits the paramount significance of the optical alignment issue.

However, an optical transceiver manufactured by the optical alignment of the conventional method is not only highly costly but also too bulky to fit in a mobile communication device such as a smartphone, and is troubled with instability issues due to a complicated structure.

Korean Patent Application No. 2014-0168272 filed on Nov. 28, 2014 by this applicant proposed an apparatus for optical transmitting and receiving as shown in FIGS. 1A and 1B.

The apparatus for optical transmitting and receiving or optical transmitting and receiving device includes a baseplate 1210' and an optical-fiber fixing block 1300'. The baseplate 1210' includes a set position for mounting an optical element 1215', a first reference hole A', and a second reference hole B' spaced by a first distance from the first reference hole A'. The optical-fiber fixing block 1300' is configured to fixedly mount at least one of a lens unit 1320' and an optical fiber 1340' optically linked with the optical element 1215', and it includes a first post C' configured to be inserted into the first reference hole A' and a second post D' configured to be inserted into the second reference hole B'.

The optical fiber 1340' is inserted along guide surfaces 1310'. The optical element 1215' and the lens unit 1320' are arranged so that their centers are vertically aligned, and a reflector 1330' is installed on the upper part of the lens unit 1320'. Light emitted from the optical fiber 1340' is deflected via the reflector 1330', focused via the lens unit 1320' and thereby made incident on the optical element 1215'. Conversely, light emitted from the optical element 1215' is focused via the lens unit 1320' and deflected via the reflector 1330' such that the light is incident on the optical fiber 1340'.

Such an optical transmitting and receiving device exhibits excellent efficiency serving the two individual purposes of transmission/reception, but has the following drawbacks.

Recent embedded system specifications require that the overall height of the optical transmitting and receiving device be 1 mm or less to fit the standard IC package. The main issue in designing and manufacturing in accordance with this requirement is that reducing the diameter or thickness of the lens unit has its light concentration ratio dropped correspondingly to inhibit a designed performance of the optical transmission and reception. In addition, reducing the external dimension of the device with the size of the lens unit maintained causes an optical loss at the reflector and an increased refraction angle of the light incident on the optical fiber to inhibit a part of the light from being guided through the optical fiber, resulting in structural misalignment of the optical system.

Here, the present inventors have determined that there is a limit to fulfilling a new specification with an existing device that performs both transmission and reception of light, and found that an optical transmitting device dedicated advantageously to optical transmissions can satisfy design requirements for sub-miniaturization as well as transmit light more efficiently.

At the same time, the present inventors have found an improved method of aligning the lens of the optical transmitting device and the light source on a substrate.

SUMMARY OF THE INVENTION

The following description of some embodiments of the present disclosure is based on these findings.

Therefore, the first and second embodiments of the present disclosure seek to provide an optical transmitting device and an optical receiving device respectively suitable for the design requirements for sub-miniaturization.

The first and second embodiments provide new types of optical transmitting and receiving devices to reduce the tolerance as well as the size of the devices which are economical, convenient to manufacture and so on.

The first and second embodiments further seek to provide aligning methods capable of limiting the alignment error between the optical transmitting and receiving devices and the substrates to within a few micrometers and minimizing the error.

Technical problems to be solved by the present disclosure are not limited to the above, but other unmentioned technical problems resolved will be clearly understood by a person of ordinary skill in the pertinent art from the description below.

According to one aspect of the first embodiment of the present disclosure, an optical transmitting device is provided including a first lens, a reflector disposed above and in alignment with the first lens, a second lens disposed on a side of and in alignment with the reflector so as to receive light reflected by the reflector, and a housing configured to house the first lens, the second lens, and the reflector. Here, the housing has a divided structure composed of a body at a lower position and a cover at an upper position, and the housing has a height less than 1 mm.

According to another aspect of the first embodiment, a method of aligning the optical transmitting device is provided including providing a substrate coupled to the optical transmitting device and including a light source, and coupling a first post to a first reference hole provided in the substrate, and coupling a second post to a second reference hole provided in the substrate, and aligning a first lens provided in the optical transmitting device with the light source of the substrate.

According to one aspect of the second embodiment, an optical receiving device.

The optical receiving device includes a focusing lens, a reflector disposed above and in alignment with the focusing lens, and a housing configured to house the focusing lens and the reflector. Here, the housing has a height less than 1 mm, and the housing has a bottom provided with a first post and a second post extending downward at predetermined front and rear positions of the bottom, respectively.

According to another aspect of the second embodiment, a method of aligning an optical receiving device is provided, including providing a substrate coupled to the optical receiving device and including a photodetector, and coupling a first post to a first reference hole provided in the substrate, and coupling a second post to a second reference hole provided in the substrate, and aligning a focusing lens provided in the optical receiving device with the photodetector of the substrate.

According to yet another embodiment of the present disclosure, an optical transmitting device includes a body and a cover. The body includes a first lens configured to modify a diverging beam of light emitted from a light source into a parallel beam of light, and a reflector arranged above the first lens and configured to reflect light from the first lens. The cover is configured to be coupled with the body to form a housing and it includes a second lens configured to collect the light from the reflector and transmit the light to an optical fiber, and an optical fiber guide unit configured to guide the optical fiber. Here, the second lens is installed at a predetermined position to fully accommodate the light reflected by the reflector and to establish a seamless optical path running from the light source through the first lens, the reflector and the second lens to the optical fiber.

According to yet another embodiment of the present disclosure, an optical communication assembly includes a body, a cover and a substrate. The body includes a collimating lens configured to modify a diverging beam of light emitted from a light source into a parallel beam of light, and a reflector arranged above the collimating lens and configured to reflect light from the collimating lens. The cover is configured to be coupled with the body to form a housing and it includes a focusing lens configured to collect the light from the reflector and transmit the light to an optical fiber, and an optical fiber guide unit configured to guide the optical fiber. The substrate is configured to be coupled to the light source and the body. Here, the focusing lens is installed at a predetermined position to fully accommodate the light reflected by the reflector and to establish a seamless optical path running from the light source through the collimating lens, the reflector and the focusing lens to the optical fiber.

The body comprises a first post and a second post installed extending downward at predetermined front and rear positions in a bottom of the body. The substrate comprises a first reference hole and a second reference hole configured to be coupled with the first post and the second post, respectively.

According to the first embodiment, by utilizing a lens group including a plurality of lenses, an optical transmitter is provided that can function as an optical transmitting device while satisfying the design requirements for sub-miniaturization, and can perform optical transmission more efficiently.

According to the second embodiment, an optical receiving device is provided that can function as an optical receiver while satisfying the design requirements for sub-miniaturization, and can perform optical reception more efficiently.

Further, the optical transmitting device according to the present alignment method minimizes the alignment error with a light source on the substrate, provides for the miniaturization thereof, and obviates the need for a separate guide member so as to reduce the manufacturing cost of the device.

Further, the optical receiving device according to the present alignment method minimizes the alignment error with a photodetector on the substrate, provides for the miniaturization thereof, and obviates the need for a separate guide member so as to reduce the manufacturing cost of the device.

Besides, different embodiments of the present disclosure exhibit a variety of corresponding effects such as the devices with excellent durability, which will be clearly illustrated by the embodiments described below.

BRIEF DESCRIPTION OF THE DRAWINGS

FIGS. 7A to 7C are conceptual diagrams illustrating a method of aligning the optical transmitting device according to the first embodiment on a substrate, of which FIG. 7B is a diagram of the principle of the method where a first post is fixed, and FIG. 7C is a diagram of the principle of the method illustrating a second post is fixed.

FIGS. 12A to 12C are conceptual diagrams illustrating a method of aligning the optical receiving device according to the second embodiment on a substrate, of which FIG. 12B is a diagram of the principle of the method where the first post is fixed, and FIG. 12C is a diagram of the principle of the method illustrating a second post is fixed.

DESCRIPTION OF THE PREFERRED EMBODIMENTS

Figure 1A:
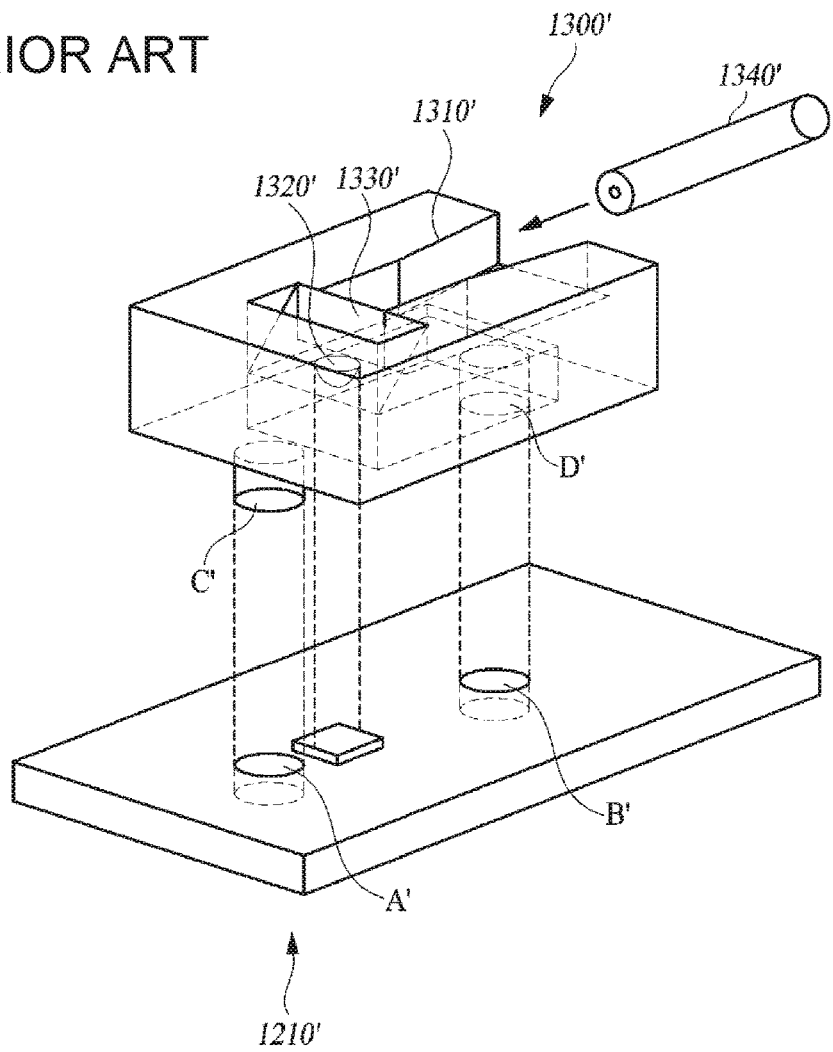
FIG. 1A is a perspective view of a conventional apparatus for transmitting and receiving light.

Hereinafter, some embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless specifically stated to the contrary.

If any component is described as 'connected', 'coupled' or 'fastened' to another component, the components are not only meant to be directly 'connected', 'coupled', or 'fastened' but also are indirectly 'connected', 'coupled', or 'fastened' via one or more additional components.

In addition, the size, shape, etc. of the components illustrated in the drawings can be exaggerated for clarity of explanation and convenience. The terms specifically defined in consideration of the configuration and operation of the present disclosure are only for explaining some embodiments of the present disclosure and are not intended to limit the scope of the present disclosure.

The transmission/reception apparatus for an optical fiber cable, according to some embodiments of the present disclosure may be manufactured as two different modules. One module is a transmitting device that performs an electric-optical signal conversion and transmits the converted optical signal via an external optical fiber cable. The other module is a receiving device that receives an optical signal via an external optical fiber cable and performs an optical-electric signal conversion. A transmitting device for an optical fiber cable according to at least one embodiment of the present disclosure will be described in the first embodiment, and a receiving device for an optical fiber cable will be described in a second embodiment.

Hereinafter, the principle, structure and then alignment method of an optical transmitting device 1 presented as the first embodiment of the present disclosure will be explained.

1. Principle of Optical Transmission

First, referring to FIG. 2, the principle of optical transmission will be described concentrating on the optical structure of the optical transmitting device 1 of the first embodiment of the present disclosure.

The optical transmitting device 1 faces a substrate 10 installed with a light source 12 as an optical element, and includes a lens group 20, a reflector 14 and an optical cable 30. The lens group 20 has a first lens 22 installed between the light source 12 and the reflector 14, and a second lens 24 installed between the reflector 14 and the optical cable. An optical fiber 32 is inserted in the optical cable 30. The reflector 14 includes, but is not limited to, a prism.

The light source 12, the first lens 22 and the reflector 14 are aligned so that the centers of the three members are aligned in the vertical direction. Likewise, the reflector 14, the second lens 24 and the optical cable 30 are laterally aligned so that the centers of the reflector 14 and the second lens 24 coincide with the center point of the light receiving portion of the optical cable 30. Methods for aligning the light source 12 and the first lens 22 are disclosed in applicant's earlier Korean Patent Application Nos. 2014-0168272 and 2013-0146599, which are hereby incorporated by reference into the contents of this application.

The first lens 22 is preferably a collimating lens and the second lens 24 is preferably a focusing lens. Light that has passed through a collimating lens becomes collimated light, and light that has passed through a focusing lens is focused. Therefore, as shown in the drawing, the light emitted from the light source 12 is collimated by passing through the first lens 22, propagates towards the reflector 14, is reflected by the reflector 14, travels towards and passes through the second lens 24, and then coupled into the core of the optical fiber 32 where the light is focused.

Multiples of the light source 12 may be aligned in a row on the substrate. In this case, multiple first lenses 22 and second lenses 24 are installed in a row in alignment with the respective light sources 12.

The adoption of the lens group 20 including the plurality of lenses of the first lens 22 and the second lens 24 is a feature of some embodiment of the present disclosure. Maintaining a single-lens structure with only a focusing lens displaced between a light source and a reflector while meeting the design requirement for sub-miniaturization of a submillimeter height limit leads to a reduced size of the lens and a shortened optical path, particularly where light needs to propagate through its micro heights. Thereby, the light emitted from the light source fails to gather accurately on the reflector, and part of the light reflected by the reflector is incident on the optical fiber at an angle with the fiber axis exceeding the fiber's total reflection critical angle to disable its propagation through the optical fiber, resulting in an optical loss with the light scattering outside the fiber cladding. To the contrary, with the adoption of the lens group 20 made of the plurality of lenses including the first lens 22 and the second lens 24, the optical transmitting device 1 of some embodiments of the present disclosure functions exclusively as an optical transmitter different from the conventional optical apparatus for both transmission and reception operations. At the same time, the optical transmitting device 1 satisfies the design requirements for sub-miniaturization, and performs optical transmission more efficiently.

The main function of the first lens 22 is to reduce the beam divergence of light emitted from the light source 12, to alleviate the burden of the second lens 24 with the duty to focus the light and at the same time to increase the optical alignment tolerance. The distributed duties between the lens with respect to the coupling of the optical signal reduces the influence of the numerical aperture (NA) which is a constraint of the optical waveguide of the optical fiber. This means that the refractivity of the lens can be adjusted according to the divergence of the light. In particular, using the second lens 24 to focus the collimated beam of light from the first lens 22 facilitates to maximally focus the light into the optical fiber that has a predetermined NA.

2. Structure of Optical Transmitting Device

Figure 2:
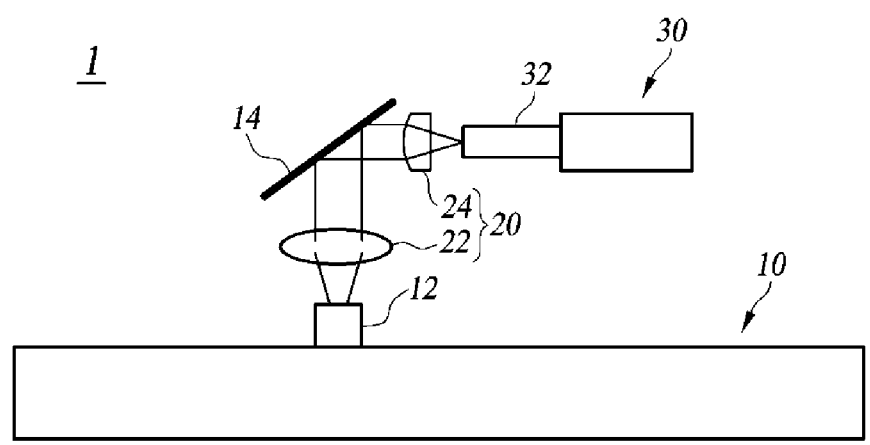
FIG. 2 is a conceptual diagram for illustrating the principle of optical transmission of an optical transmitting device according to a first embodiment.
Figure 3:
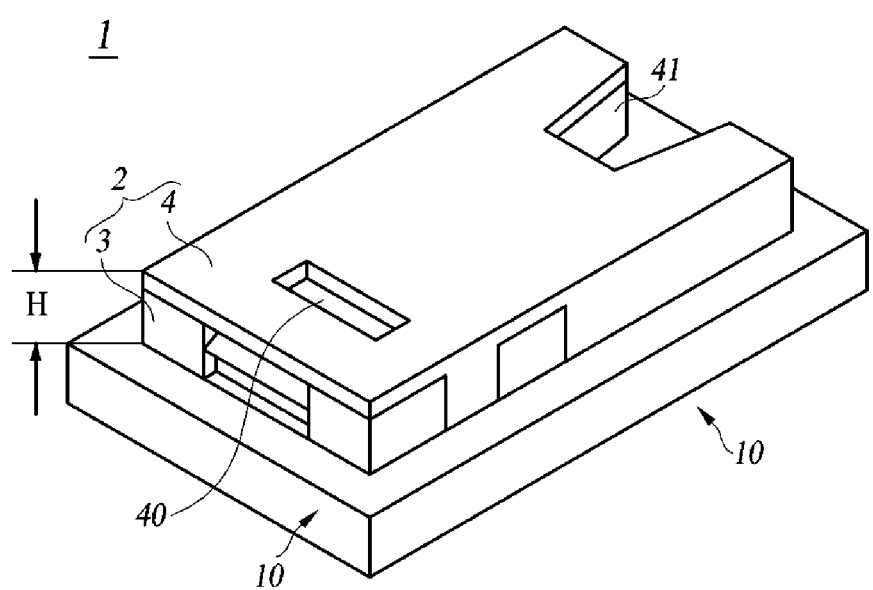
FIG. 3 is a perspective view of the overall appearance of the optical transmitting device of the first embodiment.

FIG. 3 is a perspective view of the overall appearance of the optical transmitting device 1 including the structure of FIG. 2 of the present disclosure.

The optical transmitting device 1 includes a housing 2 in which the lens group 20 and the reflector 14 are installed. The optical transmitting device 1 is coupled face-to-face to the substrate 10 on which the light source 12 is installed.

The housing 2 is approximately quadrangular and has a divided structure of a body 3 and a cover 4. The cover 4 has its upper surface provided with a hole 40 for injecting an adhesive such as epoxy, and has at its rear a trapezoidal cut to provide a guide 41 for the optical cable 30.

The height (H) of the housing 2 is on a sub-millimeter, or sub-miniature, scale. This is a smaller thickness than a typical electronic chip, and the optical transmitting device 1 of some embodiments of the present disclosure is useful for application to devices with small thickness or small form factor.

The optical transmitting device 1 of some embodiments has a molded article for optical alignment removed, and it is suffice to perform the optical alignment with the housing 2 and the substrate 10 themselves and thereby reduces the alignment error generated by using the molded article. The housing 2 is manufactured by plastic injection molding to facilitate mass production and assembly thereof.

Figure 4A:
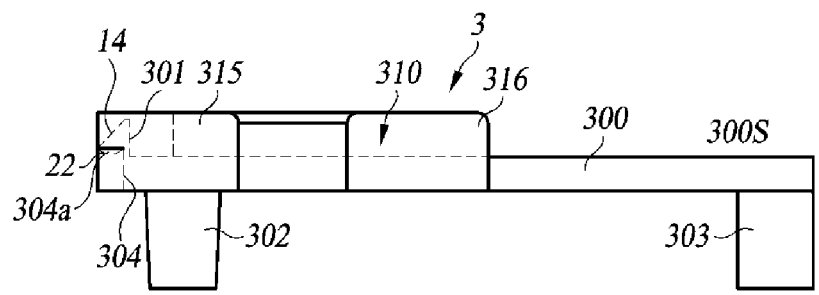
FIGS. 4A and 4B are a left side view and a plan view of the body of the optical transmitting device of the first embodiment.
Figure 4B:
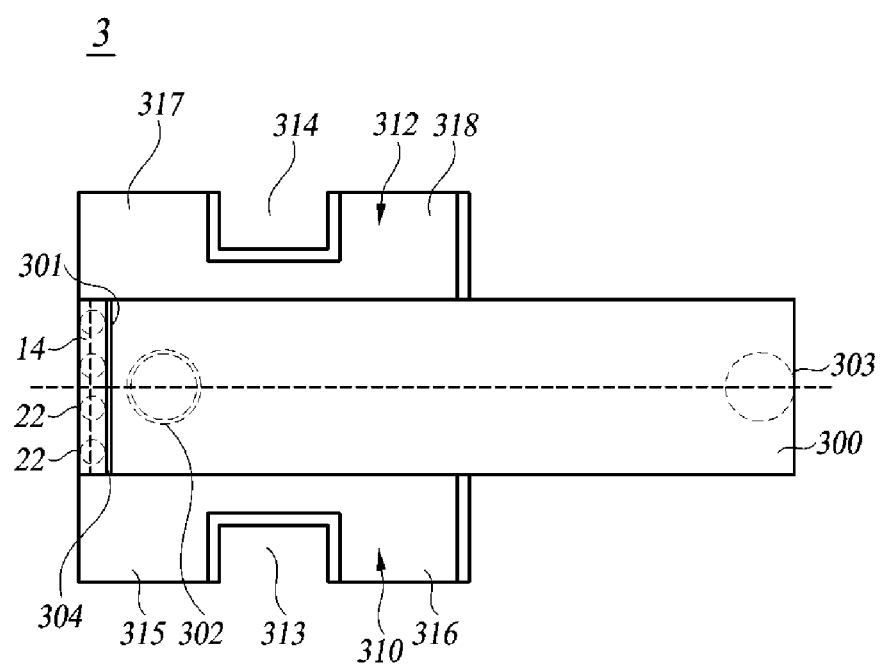

FIGS. 4A and 4B are a left side view and a plan view of the body 3 of the optical transmitting device 1.

The body 3 has a bottom 300 of a long rectangle, a left side coupling portion 310 and a right side coupling portion 312, each having a height larger than the bottom 300 and extending from near the front of the tip of the bottom 300 to near a middle region thereof. The bottom 300 is centrally positioned and enclosed by the left coupling portion 310 and the right coupling portion 312 from both sides. Starting from the front to the rear, the left coupling portion 310 includes a first flap 315 projecting upward, a first receiving hole 313 and a first latch member 316 projecting upward. Likewise, the right coupling portion 312 includes a second flap 317, a second receiving hole 314 and a second latch member 318 projecting upward. Generally, the left coupling portion 310 and the right coupling portion 312 are symmetrical structures of the same shape.

The first flap 315 and the second flap 317 extend vertically upward from the bottom 300, and protect the first lens 24 and the reflector 14 from the left and right, respectively. The latch members 316, 318 and the receiving holes 313, 314 are members to be coupled with corresponding elements of the cover 4. In this arrangement, the left coupling portion 310 and the right coupling portion 312 provide a protective frame for the lens and the reflector and provide a fastening structure for cooperating with the cover 4. Therefore, as long as their functions are offered, the above members may have their size, shape and position arbitrarily changed.

The bottom 300 and the coupling portions 310, 312 may be integrated with one another, although their formation is not necessarily limited thereto.

The bottom 300 has an open space 300S behind the left and right coupling portions 310, 312, which cooperates with the cover 4 so as to provide a space through which the optical fiber passes. This optical fiber space is closed by the cover 4 at its third flap 403 and fourth flap 408 described below to provide an optical fiber guiding structure which is impervious to external impacts and vibrations.

The bottom 300 is formed with a first post 302 and a second post 303 in predetermined positions forward and rearward respectively along the longitudinal center line thereof, which extend downward toward the substrate. The first post 302 and the second post 303 are circular columns protruding downward. In the example shown in FIG. 4A, in order to tolerate the error of optical alignment, the first post 302 is a tapered column having its diameter gradually reduced downward by minute degrees, and the second post 303 is a straight column having a constant diameter. The diameter of the first post 302 is larger than that of the second post 303 in the vicinity of the top of the first post 302, that is, adjacent to the bottom 300. This means that with respect to the second post 303, the diameter of the first post 302 may be larger on its upper side of a reference point in the vertical direction and smaller on its lower side of the reference point.

Then, the body 3 of some embodiments of the present disclosure utilizes a reflector mount 301 and a first lens mount 304 for installing the reflector 14 and the first lens 22, respectively. As shown in FIG. 4A, the reflector mount 301 rises vertically from the tip of the bottom 300. The first lens mount 304 is spaced apart from the reflector mount 301 by a predetermined distance and is formed in front of the reflector mount 301, and it extends from a lower end portion of the bottom 300 to a height slightly higher than the start point of the reflector mount 301 until it is redirected to extend forward laterally to generally form an inverted L-shape. The reflector mount 301 and the first lens mount 304 may be made to be integrated with the bottom 300 or they may be separately manufactured in a unitized module and coupled to the bottom 300.

The first lens 22 is installed on an upper surface 304a of the first lens mount 304 with its convex surface facing downward. The reflector 14 is obliquely installed across the end of the upper surface 304a and the apex of the reflector mount 301. When multiples of the first lens 22 are installed, as shown in FIG. 4B, the first lenses 22 are installed in a row along the upper surface 304a with a certain interval therebetween. In this case, the reflector 14 may be a single prism installed for providing a constant reflecting surface.

As long as the reflector mount 301 and the first lens mount 304 perform the optical transmission function described with reference to FIG. 2 and serve to house the first lens 22 and the reflector 14 so as to provide an optical path suitable for the optical transmitting device 1 of some embodiments of the present disclosure, they may be freely modified in shape, size and position.

As described above, the present disclosure in some embodiments adopts a divided structure wherein the first lens 22 and the reflector 14 are installed in the body 3, and the second lens 24 is installed in the cover 4, which facilitates designing and manufacturing of a suitable compact optical transmitting device for sub-miniaturization requirements.

Figure 5A:
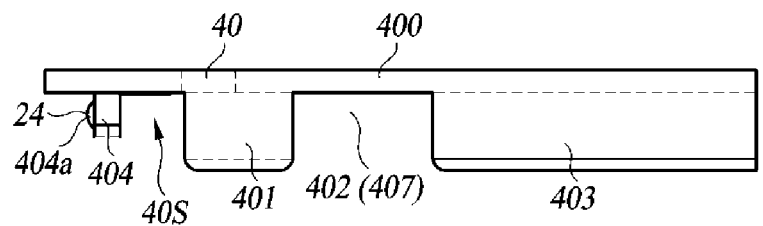
FIGS. 5A and 5B are a left side view and a plan view of a cover of the optical transmitting device of the first embodiment.
Figure 5B:
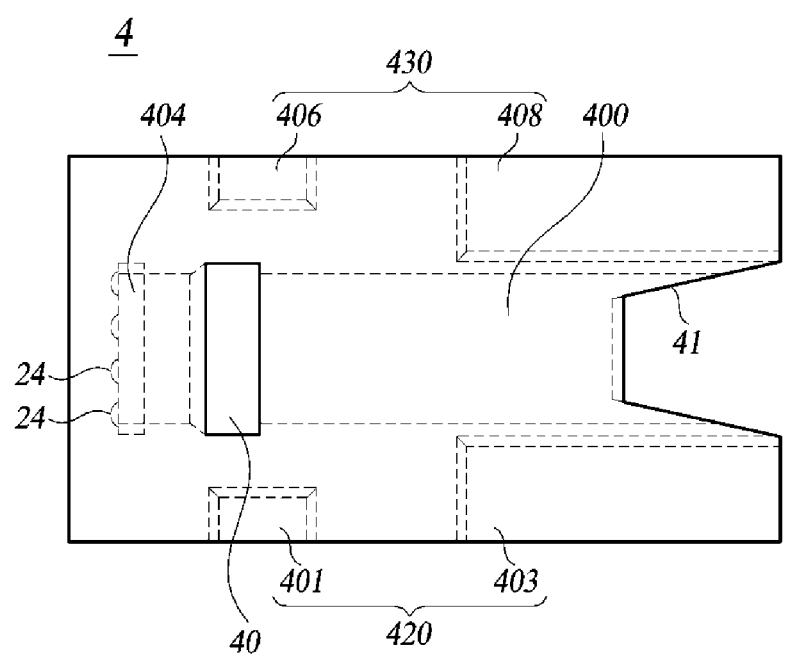

FIGS. 5A and 5B are a left side view and a plan view of the cover 4 of the optical transmitting device 1.

The cover 4 has an elongated rectangular shape and includes an upper side 400 wider than the bottom 300. On the lower part of the upper side 400, a left coupling portion 420 is formed to correspond to the left side contour of the body 3 and a right coupling portion 430 is formed to correspond to the right side contour of the body 3. Starting from the front to the rear, the left coupling portion 420 includes a third latch member 401 projecting downward, a third receiving hole 402, and a third flap 403 projecting downward. Similarly, the right coupling portion 430 includes a fourth latch member 406 projecting downward, a fourth receiving hole 407, and a fourth flap 408 projecting downward from the front.

As long as the left coupling portion 420 and the right coupling portion 430 serve the purpose of providing a protection frame of the optical fiber cable and fastening with corresponding elements of the body 3, they may be arbitrarily modified in size, shape and position. In some embodiments, the upper side 400 and these coupling portions 420, 430 are integrated, but are not necessarily limited thereto.

As described above, the upper side 400 is provided with the hole 40 for injecting an adhesive such as epoxy at the midpoint in the width direction in front of the upper side 400. The epoxy resin injected through the hole 40 securely binds the optical fiber and the cover 4 together, fills the gap between the wall surface of the second lens 24 and the optical fiber end in the coupling process, so as to reduce the reflection that may occur from the surface through which the light is transmitted. Some embodiments of the present disclosure inject, in addition to epoxy, other highly viscous materials enabling optical communication in cooperation with optical fibers and plastic molded parts. For example, as a replacement or addition to the epoxy, refractive index matching oil may be injected to desirably reduce the NA of the light incident on the optical fiber.

In some embodiments of the present disclosure, the cover 4 utilizes a second lens mount 404 for mounting the second lens 24. The second lens mount 404 extends vertically downward from the front portion of the upper surface 300, as shown in FIG. 5A. The second lens 24 is installed on a front surface 404a of the second lens mount 404. The second lens 24 is installed at an elevation set according to the position of the reflector 14 so as to fully accommodate the light reflected by the reflector 14. When there are multiples of the first lens 22, as shown in FIG. 5B, the matching number of second lenses 24 are installed.

The portion where the second lens 24 and the second lens mount 404 are installed remains in the cover 4 as an open space 40S which, however, is laterally closed by the first flap 315 and the second flap 317 to provide a structure of the lens system which is impervious to external impact and vibration.

As long as the second lens mount 404 serves its purpose of housing the second lens 24 described with reference to FIG. 2 so as to provide an optical path suitable for the optical transmitting device 1 of some embodiments of the present disclosure, it may be freely modified in shape, size and position.

As described above, the present disclosure in some embodiments adopts a divided structure between the body 3 and the cover 4, which facilitates designing and manufacturing of a suitable compact optical transmitting device for sub-miniaturization requirements.

In addition, relocating the second lens 24 installed on the cover 4 alone without adjustment of the body 3 may adjust the distance to the optical fiber or provide an alignment with the path of the reflected light from the reflector 14, which facilitates the operation of optical alignment and calibration.

Figure 6A:
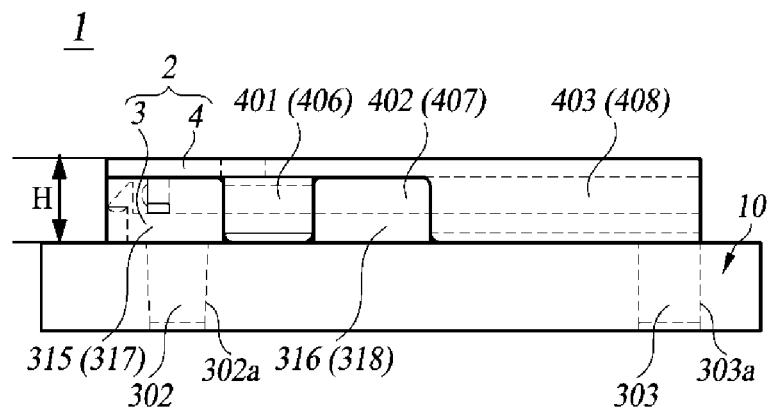
FIGS. 6A and 6B are a left side view and a plan view illustrating that a housing made of the body and the cover of the first embodiment is coupled with a substrate.
Figure 6B:
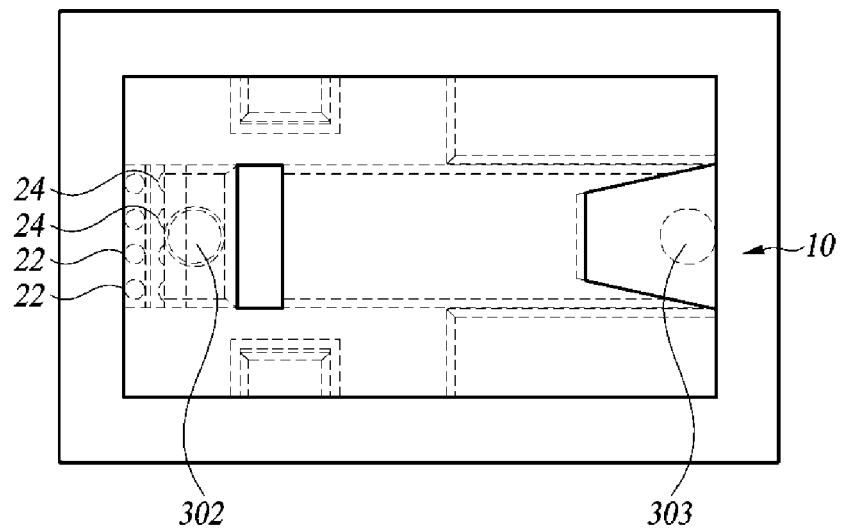

FIGS. 6A and 6B are a left side view and a plan view illustrating that the housing 2 made of the body 3 and the cover 4 described above is coupled with the substrate 10. For convenience of explanation, FIG. 6A presents a reference numeral of each left side member, accompanied by its right side counterpart in parentheses.

The first flap 315 and the second flap 317 of the body 3 are fastened to the cover 4 so as to be in contact with the upper side 400 of the cover 4, to provide a protective frame for laterally protecting the optical system including the first lens 22, the reflector 14 and the second lens 24.

In the first receiving hole 313 and the second receiving hole 314 of the body 3, the third latch member 401 and the fourth latch member 406 of the cover 4 are accommodated, respectively. Additionally, in the third receiving hole 402 and the fourth receiving hole 407 of the cover 4, the first latch member 316 and the second latch member 318 of the body 3 are accommodated, respectively. Repetitive fastening of these continuous concavo-convex structures provides secure and accurate fastening of the body 3 and the cover 4, and it can minimize misalignment after assembly.

Further, the third flap 403 and the fourth flap 408 of the cover 4 are coupled with the body 3 abutting against the bottom 300 while closing the space 300s thereof so as to provide an optical fiber guiding structure which is impervious to external impacts or vibrations.

One of the structural features of the housing 2 of the optical transmitting device of some embodiments is that the body 3 is provided with the first lens 22 and the reflector 14 and the cover 4 has the second lens 24 and the optical fiber guide unit installed therein. Thus, while maintaining this feature, the present disclosure is capable of various modifications at the level of those skilled in the art, including, for example, providing the first flap and the second flap on the cover 4 with the third flap and the fourth flap provided on the body 3, or inversely forming the latch members and the receiving holes between the body 3 and the cover 4, or switching the order of forming the latch members and the receiving holes.

Further, although the explanation has been made on the premise that the light source 12 is arranged outside the first post 302 and the second post 303, the light source 12 when relocated halfway between the first post 302 and the second post 303 as disclosed in Korean Patent Application No. 2014-0168272 may be accommodated by the present disclosure with an appropriate adaptation of the housing structure.

Referring again to FIGS. 6A and 6B, the housing 2 of the present disclosure is coupled to the substrate 10.

The substrate 10 is formed with a first reference hole 302a and a second reference hole 303a for accommodating the first post 302 and the second post 303 of the housing 2. The first post 302 and the second post 303 are inserted into the first reference hole 302a and the second reference hole 303a, respectively. The first post 302 which is the tapered column is initially inserted into the first reference hole 302a with a minute clearance remaining therebetween. As the insertion progresses gradually, the first post 302 is fixed in a position where it comes into contact with the first reference hole 302a without gaps.

As described later, the optical transmitting device 1 of some embodiments having such coupling structure can minimize a misalignment that may occur in the process of assembling with the substrate 10.

3. Alignment Method of Optical Transmission Device

The principle of the alignment method of the optical transmitting device of the present disclosure will be described with reference to FIGS. 7A to 7C, which mainly shows the plan view of the substrate 10.

With respect to the light source 12 provided on the substrate 10, the first reference hole 302a and the second reference hole 303a are formed in a line. The light source 12, first reference hole 302a and second reference hole 303a respectively have center lines 111, 112 and 113 in the widthwise direction (vertical direction in the drawing), and the light source 12, first reference hole 302a and second reference hole 303a have a longitudinal (horizontal direction in the drawing) center line as indicated by 114. "A" is the gap between center line 111 and center line 112, and "B" is the spacing between center line 112 and center line 113.

In the small form factor optical transmitting device 1 with a height of less than 1 mm, correction of assembling tolerance means eliminating errors of several micrometers, so a sophisticated aligning operation is required. Typically, the substrate 10 is completed and supplied in advance according to specifications. The principal interest in the assembly of the substrate 10 and the optical transmitting device 1 is the alignment of the first lens 22 with the least possible deviation with respect to the light source 12 located on the substrate 10. The ideal assembly for this purpose provides a perfect alignment of the centers of the respective reference holes with the centers of the respective posts free of deviation of even several μm. However, it is difficult to make a complete intermeshing of members in the actual assembly process. A solution to this problem is to minimize the error by having either one of the first post 302 and the second post 303 fixed to eliminate the tolerance issue, and having the tolerance of the other post to exclusively affect the position of the first lens 22 to be aligned with the light source 12.

Figure 7A:
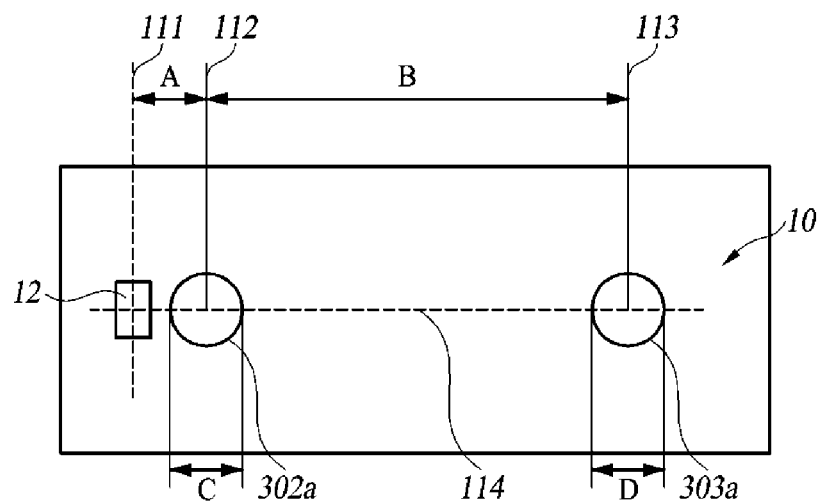
Figure 7B:
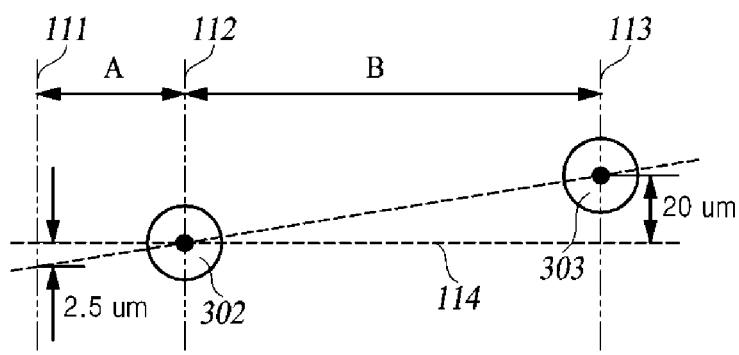

FIG. 7B is a diagram of the principle of the method where the first post 302 is fixed immovably. It is assumed that A:B=1:8 and the second post 303 is located deflected upward by 20 μm from the center of the second reference hole 303a. In this case, the first lens 22 is deviated from the light source 12 downwardly by 2.5 μm by proportional expression.

Figure 7C:
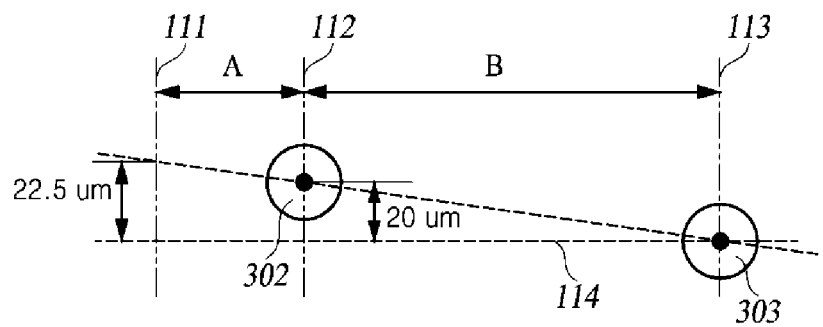

FIG. 7C is a diagram of the principle of the method illustrating the second post 303 is fixed immovably. It is assumed that A:B=1:8 and the first post 302 is located deflected upward by 20 μm from the center of the first reference hole 302a. In this case, the first lens 22 is deviated from the light source 12 upwardly by 22.5 μm by proportional expression.

Therefore, when the light source 12 is arranged outside with respect to all the reference holes, fixing the first post 302 in proximity to the light source 12 can eventually reduce the nine-fold error than when the second post 303 is fixed. The above principle is applied not only to the case where the post deviates to the upward direction from the center of the reference hole but also to the case where the post deviates in the downward or left/right direction.

Those skilled in the art will appreciate that assembly errors can be minimized as the proportional relationship of A:B increases, that is, as the distance between posts increases or the first post is closer to the light source or the first lens.

In order to fix the first post 302 to the first reference hole 302a, the optical transmitting device 1 of some embodiments of the present disclosure has the first post 302 designed as a tapered column so that it is inserted into the first reference hole 302a initially with minute degrees of clearance provided, and as the insertion gradually progresses, the first post 302 is fixed at a position where it is in contact with the first reference hole 302a without gaps.

The fixed position may be a point where the diameters of the first post 302 and the first reference hole 302a coincide. However, since the post is molded with, for example, a plastic material, it has a property that, when depressed, it is inserted by being compressed and deformed, and when pressure is released, returns to the original shape by elastic restoring force. Therefore, the fixed position may be a position where the diameter of the first post 302 is slightly larger than that of the first reference hole 302a, which is a margin for facilitating the fixation of the first post 302.

From the above, one can see that it is desirable to design the first post 302 as a tapered column having its diameter continuously increased from a range larger than the diameter of the first reference hole 302a to a range smaller than the same.

When the position of the first post 302 is fixed, only the position of the second post 303 affects the alignment of the light source and the lens, but the latter effect is very small compared to the effect on the lens by the deviation of either the first post 302 or both posts 302, 303 from the centers of all the reference holes. Therefore, it becomes possible to restrict the alignment error of the light source and the lens to within a few micrometers to minimize it.

The following describes the principle, structure and then the alignment method of an optical receiving device 1' presented as the second embodiment of the present disclosure.

1. Principle of Optical Reception

Figure 8:
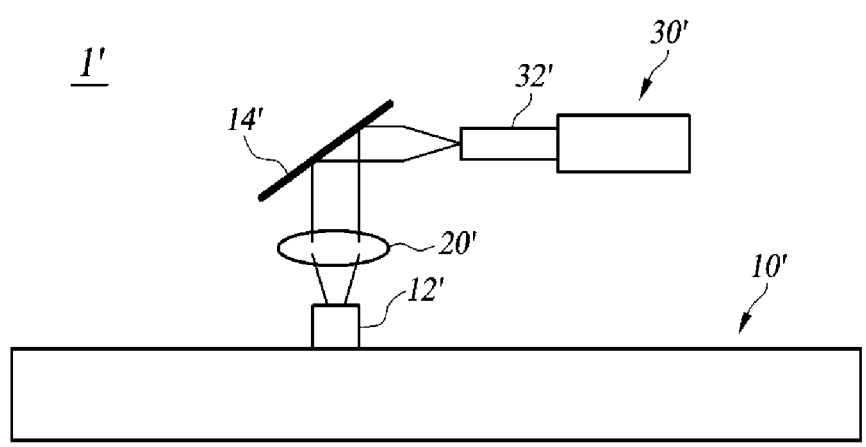
FIG. 8 is a conceptual diagram illustrating the principle of optical reception of the optical receiving device according to the second embodiment.

Referring first to FIG. 8, the principle of optical reception will be described concentrating on the optical structure of the optical receiving device 1' of the second embodiment of the present disclosure.

The light receiving device 1' according to some embodiments of the present disclosure faces a substrate 10 installed with a photodetector 12' as an optical receiving element, and includes a lens 20', a reflector 14' and an optical cable 30'. The lens 20' is provided between the photodetector 12' and the reflector 14'. An optical fiber 32' is inserted in the optical cable 30'. The reflector 14' includes, but is not limited to, a prism.

The photodetector 12', lens 20' and reflector 14' are aligned so that the centers of the three members are at the same elevation. Likewise, the reflector 14' and the optical cable 30 are laterally aligned so that both members are aligned such that the reflector 14' coincide with the center point of the light transmitting portion of the optical cable 30'.

The lens 20' is preferably a focusing lens. The light having passed through the focusing lens is focused. Therefore, as shown in the drawing, the light emitted from the optical fiber 32' is incident on the reflector 14', is reflected by the reflector 14' at right angle, travels downward in the drawing and passes through the lens 20' where the light is focused and then incident on the photodetector 12'.

Multiples of the photodetector 12' may be aligned in a row on the substrate. In this case, multiple lenses 20' are installed in a row in alignment with the respective photodetectors 12'.

It is very difficult to design an optical transceiver that performs both optical transmission and optical reception while satisfying the design requirements for sub-miniaturization of a submillimeter height limit. However, it has been found that the single-lens structure with the lens size reduced for use as an optical receiving device exhibits an excellent optical receiving efficiency over prior art. On the other hand, the optical transmitting device needs to adopt a lens group for transmitting light by focusing the same to the optical fiber at the precise point.

2. Structure of Optical Receiving Device

Figure 9:
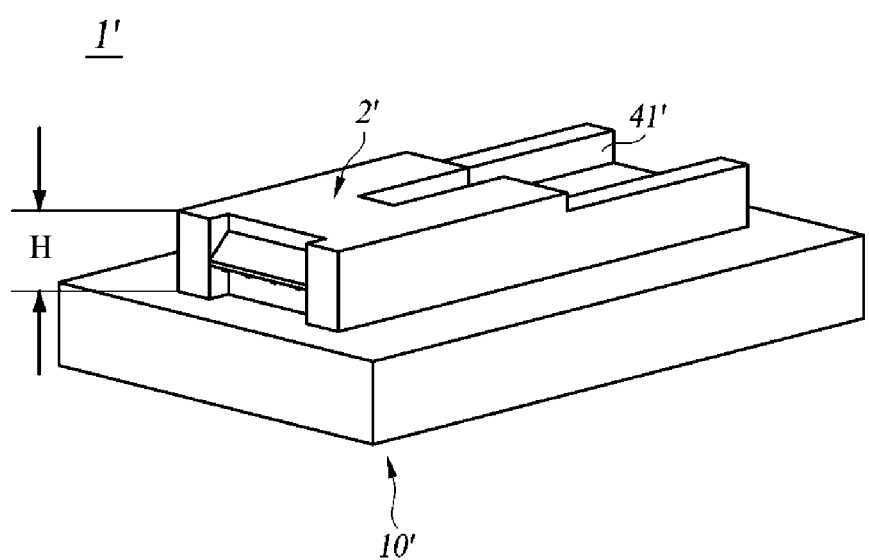
FIG. 9 is a perspective view of the overall appearance of the optical receiving device of the second embodiment.

FIG. 9 is a perspective view of the overall appearance of the optical receiving device 1' including the structure of the optical receiving device of FIG. 8 according to some embodiments.

The optical receiving device 1' includes a housing 2' in which a lens 20' and a reflector 14' are installed. The optical receiving device 1' is coupled face-to-face to the substrate 10' on which the photodetector 12' is installed.

The height (H) of the housing 2' is on a sub-millimeter, or sub-miniature, scale. This is a smaller thickness than a typical electronic chip, and the optical receiving device 1' of some embodiments of the present disclosure is useful for application to devices with small thickness or small form factor.

The optical receiving device 1' of some embodiments has a molded article for optical alignment removed, and it is suffice to perform the optical alignment with the housing 2' and the substrate 10' themselves and thereby reduces the alignment error generated by using the molded article. The housing 2' is manufactured by plastic injection molding to facilitate mass production and assembly thereof.

The housing 2' has guide surfaces 41' adapted to guide the optical fiber 32' to the inner center of the housing 2'.

Figure 10A:
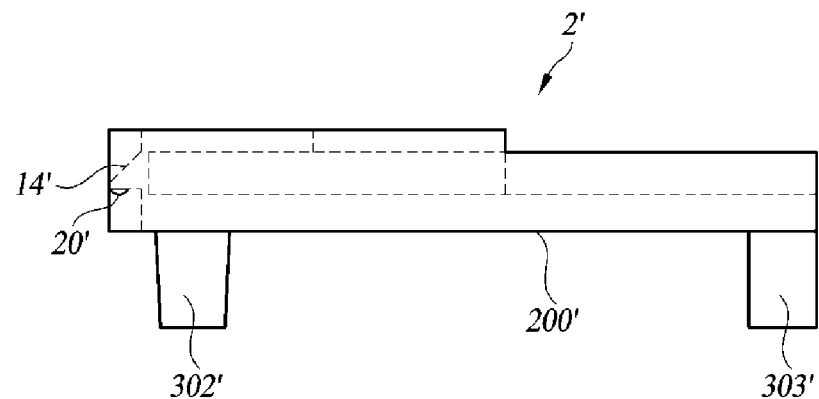
FIGS. 10A and 10B are a left side view and a plan view of the optical receiving device of the second embodiment.
Figure 10B:
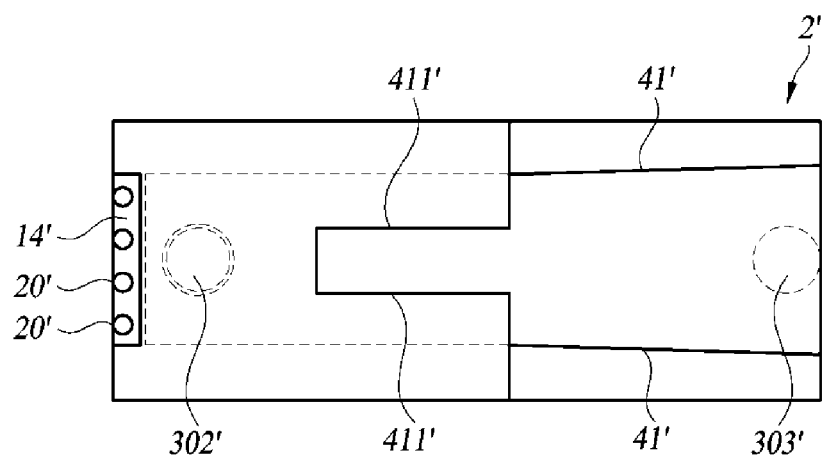

FIGS. 10A and 10B are a left side view and a plan view of the housing 2' of the optical receiving device 1'.

The optical fiber 32' which has passed through a space defined by the guide surfaces 41' of the housing 2' further passes through a space defined by central guide surfaces 411' into a position where it faces the reflector 14'. Under the reflector 14', four lenses 20' are arranged in a row along the width direction of the housing 2' in the illustrated example. This arrangement is advantageous in that flexibility and design freedom can be increased when, for example, multiples of the optical fiber 32' are disposed between the guide surfaces 41' or even if the position of any one of optical fibers 32' is somewhat misaligned because the light emitted from the optical fibers 32' can be deflected by the reflector 14' and directed to one of the lenses 20'.

The housing 2' has a bottom 200' formed with a first post 302' and a second post 303' in predetermined positions forward and rearward respectively along the longitudinal center line thereof, which extend downward toward the substrate. The first post 302' and the second post 303' are circular columns protruding downward. In the example shown in FIG. 10A, in order to tolerate the error of optical alignment, the first post 302' is a tapered column having its diameter gradually reduced downward by minute degrees, and the second post 303' is a straight column having a constant diameter. The diameter of the first post 302' is larger than that of the second post 303' in the vicinity of the top of the first post 302', that is, adjacent to the bottom 200'. This means that with respect to the second post 303', the diameter of the first post 302' may be larger on its upper side of a reference point in the vertical direction and smaller on its lower side of the reference point.

Figure 11:
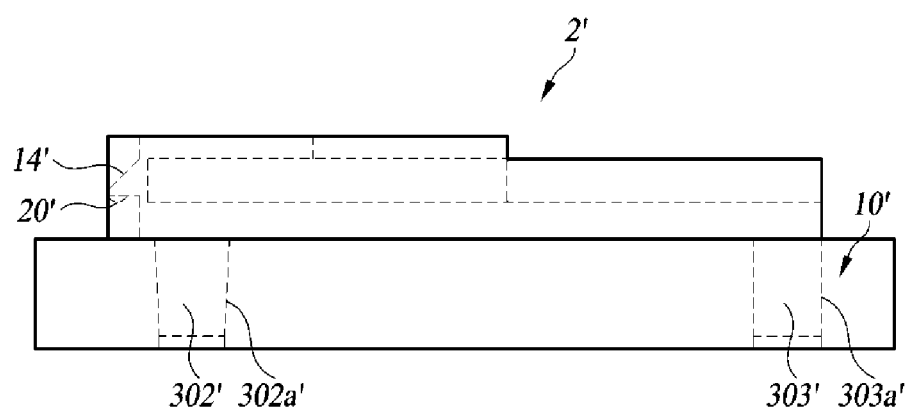
FIG. 11 is a left side view illustrating that the housing of the second embodiment is coupled to the substrate.

FIG. 11 is a left side view illustrating that the housing 2' is coupled to the substrate 10'.

The substrate 10' is formed with a first reference hole 302a' and a second reference hole 303a' for accommodating the first post 302' and the second post 303' of the housing 2'. The first post 302' and the second post 303' are inserted into the first reference hole 302a' and the second reference hole 303a', respectively. The first post 302' which is the tapered column is initially inserted in first reference hole 302a' with a minute clearance remaining therebetween. As the insertion progresses gradually, the first post 302' is fixed in a position where it comes into contact with the first reference hole 302a' without gaps.

As described later, the optical receiving device 1 of some embodiments having such coupling structure can minimize a misalignment that may occur in the process of assembling with the substrate 10'.

3. Method of Arranging Optical Receiving Device

The principle of the alignment method of the optical receiving device of the present disclosure will be described with reference to FIGS. 12A to 12C which mainly show the plan view of the substrate 10.

With respect to the photodetector 12' provided on the substrate 10', the first reference hole 302a' and the second reference hole 303a' are formed in a line. The photodetector 12', first reference hole 302a' and second reference hole 303a' respectively have center lines 111', 112' and 113' in the width direction (vertical direction in the drawing), and the photodetector 12', first reference hole 302a' and second reference hole 303a' have a longitudinal (horizontal direction in the drawing) center line as indicated by 114'. "K" is the gap between center line 111' and center line 112', and "L" is the spacing between center line 112' and center line 113'.

In the small form factor optical transmitting device 1' with a height of less than 1 mm, correction of assembling tolerance means eliminating errors of several micrometers, so a sophisticated aligning operation is required. Typically, the substrate 10' is completed and supplied in advance according to specifications. The principal interest in the assembly of the substrate 10' and the optical receiving device 1' is the alignment of the lens 20' with the least possible deviation with respect to the photodetector 12' located on the substrate 10'. The ideal assembly for this purpose provides a perfect alignment of the centers of the respective reference holes with the centers of the respective posts free of deviation of even several μm. However, it is difficult to make a complete intermeshing of members in the actual assembly process. A solution to this problem is to minimize the error by having either one of the first post 302' and the second post 303' fixed to eliminate the tolerance issue, and having the tolerance of the other post to exclusively affect the position of the lens 20' to be aligned with the photodetector 12'.

Figure 12A:
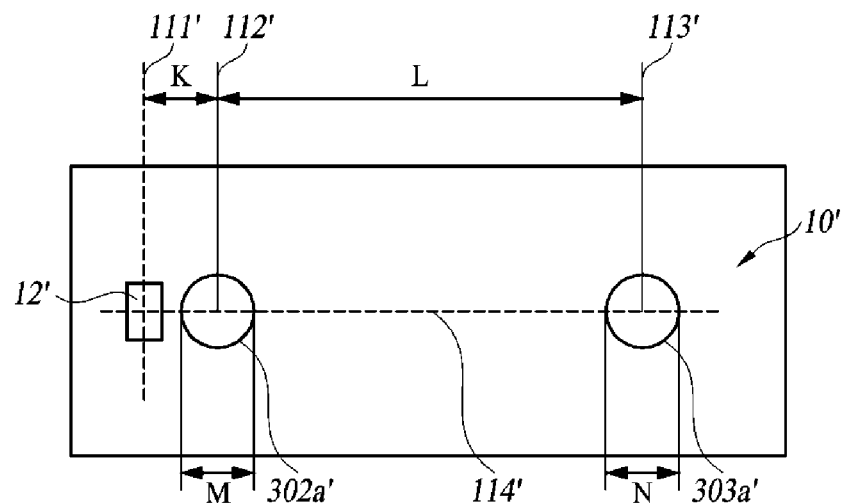
Figure 12B:
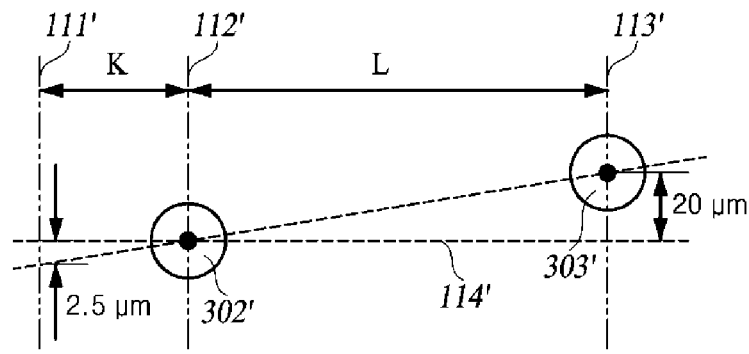

FIG. 12B is a diagram of the principle of the method where the first post 302' is fixed immovably. It is assumed that K:L=1:8 and the second post 303' is located deflected upward by 20 μm from the center of the second reference hole 303a'. In this case, the first lens 20' is deviated from the photodetector 12' downwardly by 2.5 μm by proportional expression.

Figure 12C:
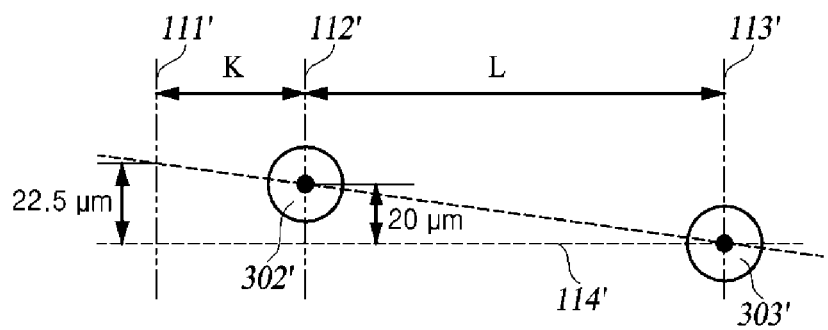
Figure 1A:
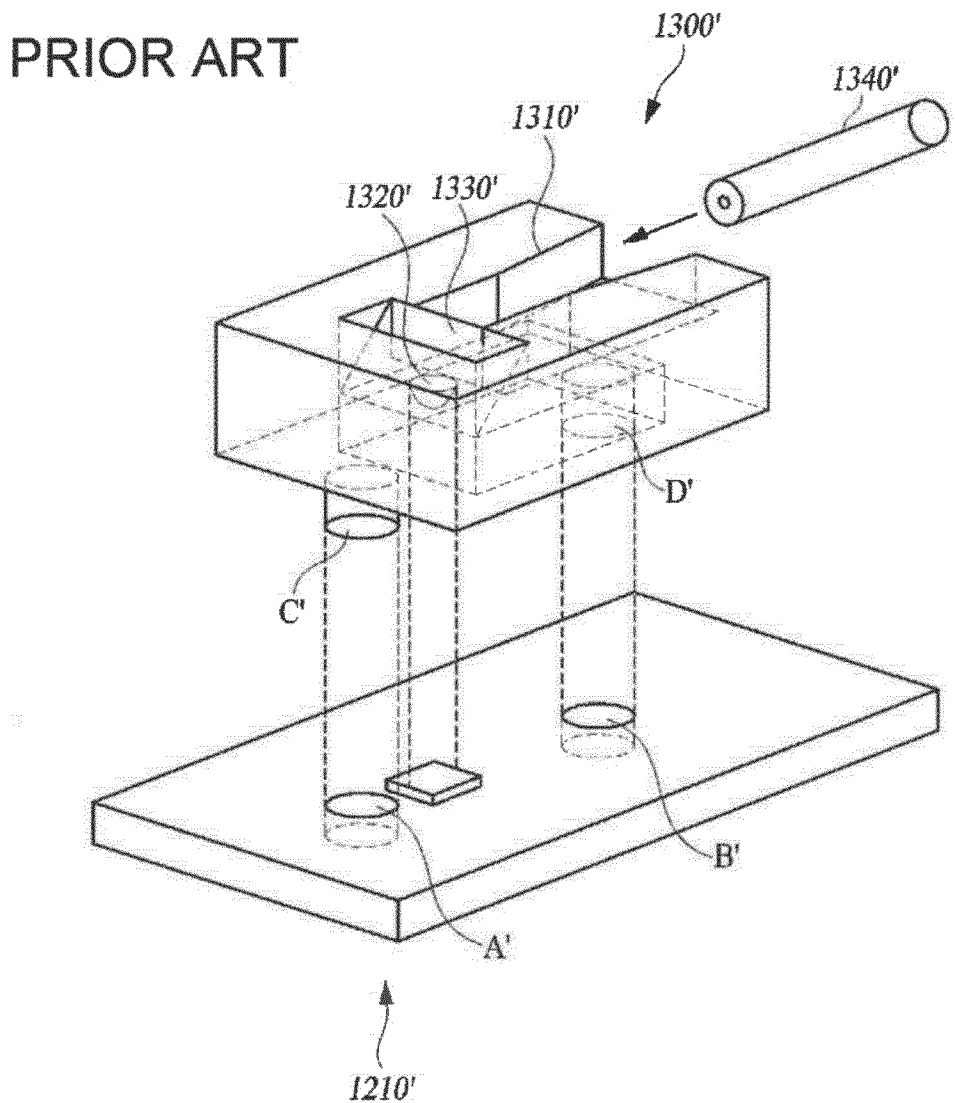
Figure 1B:
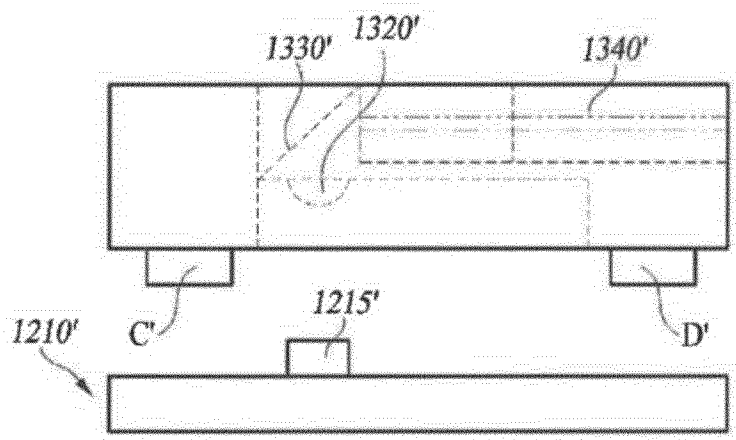
Figure 2:
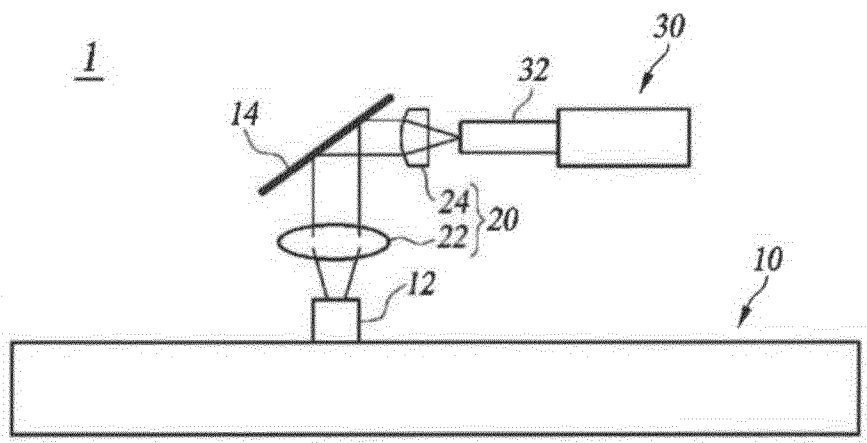
Figure 3:
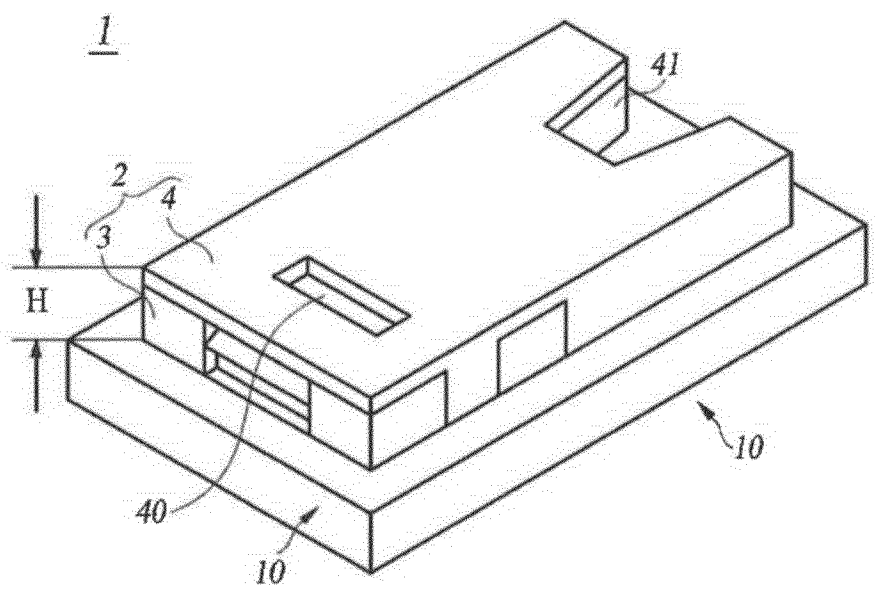
Figure 4A:
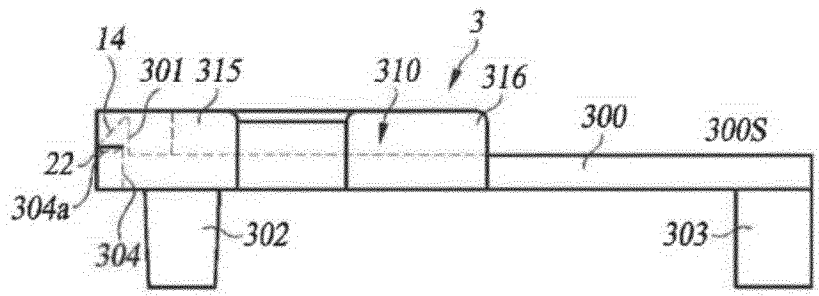
Figure 4B:
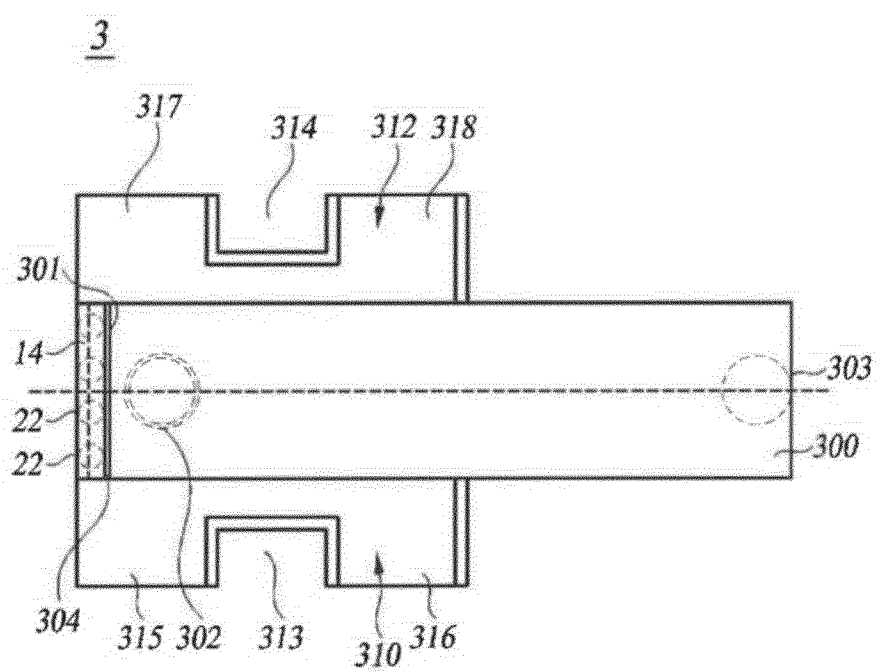
Figure 5A:
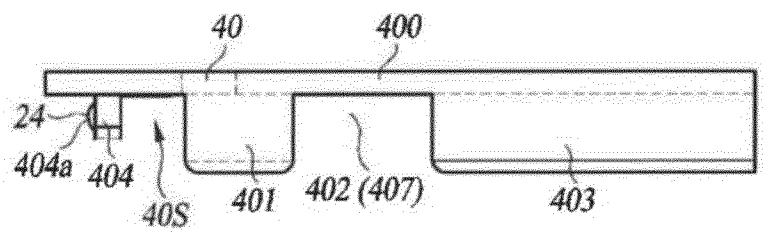
Figure 5B:
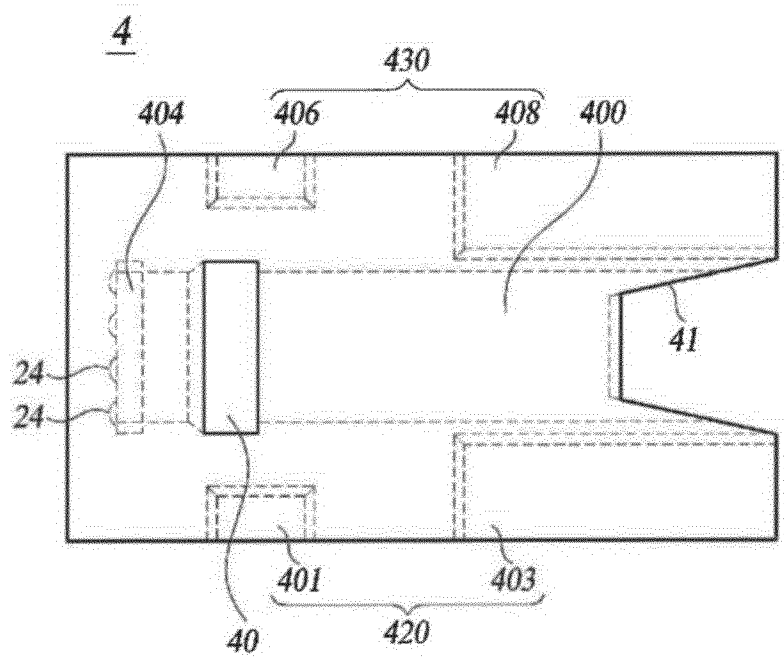
Figure 6A:
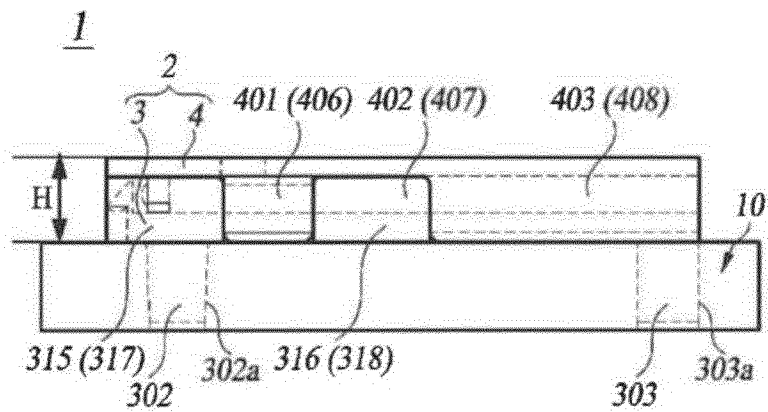
Figure 6B:
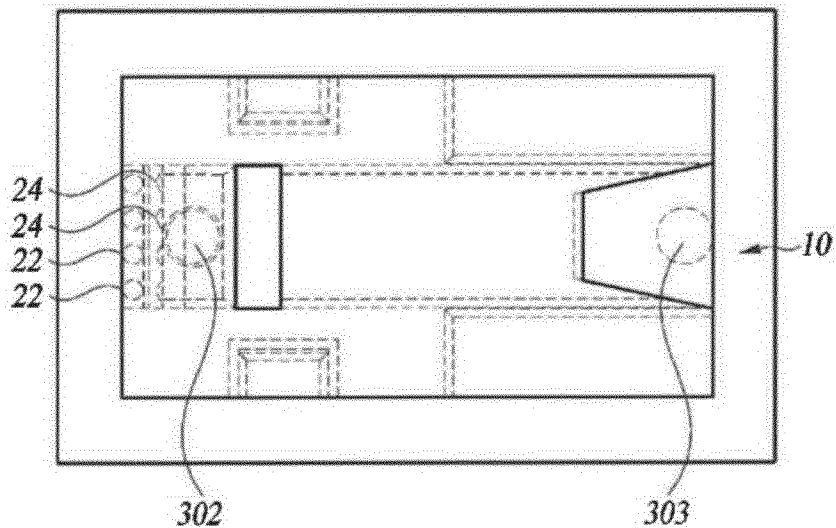
Figure 7A:
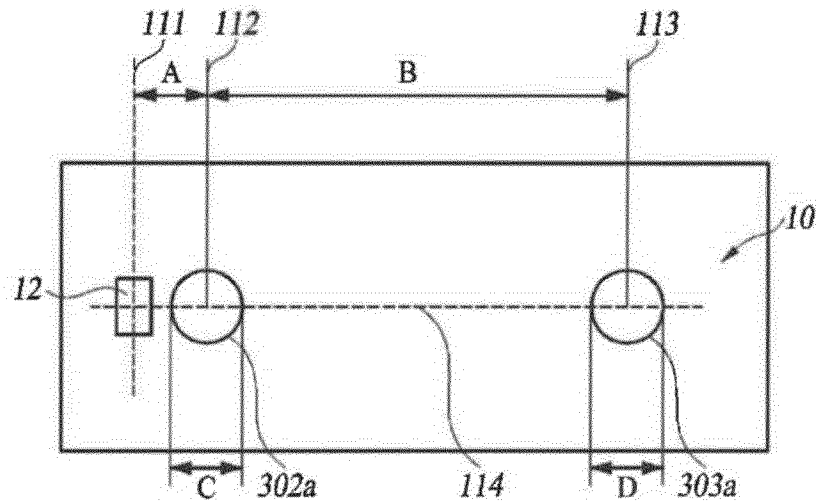
Figure 7B:
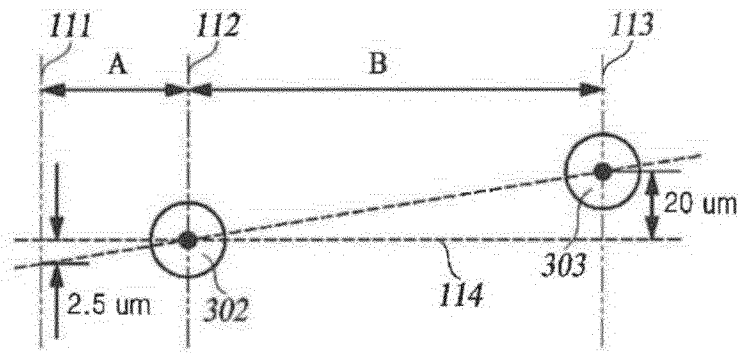
Figure 7C:
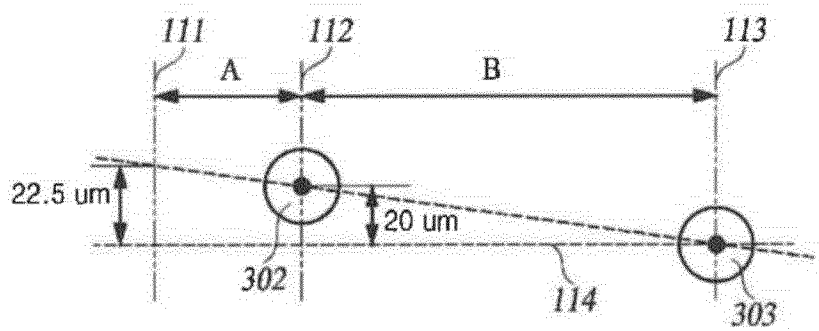
Figure 8:
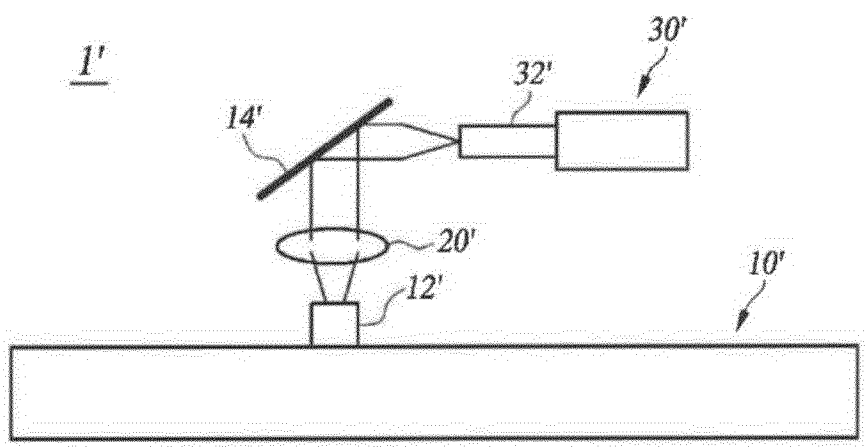
Figure 9:
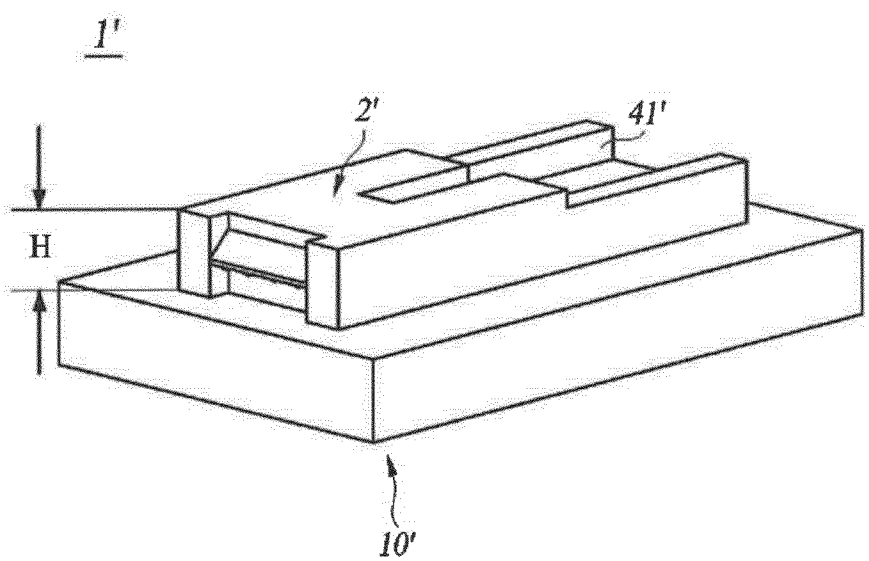
Figure 10A:
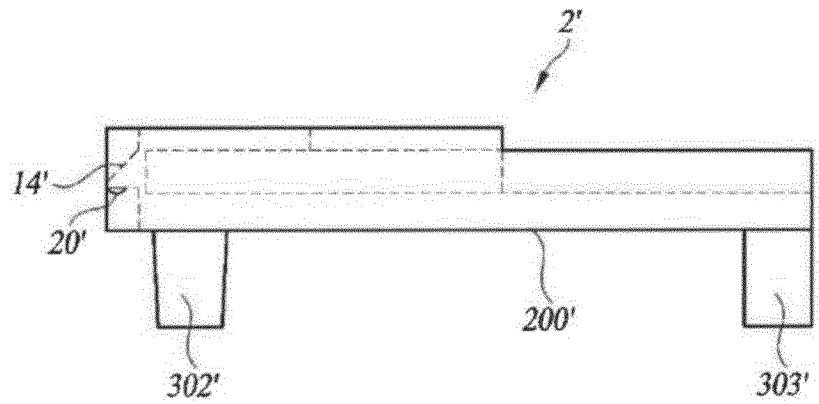
Figure 10B:
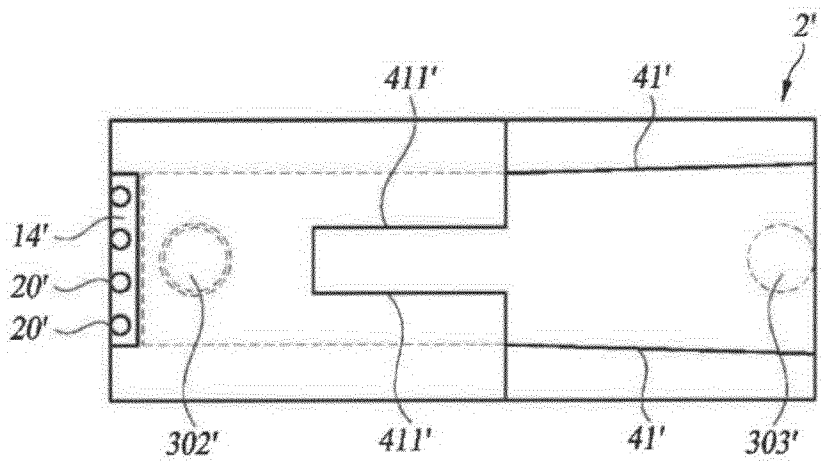
Figure 11:
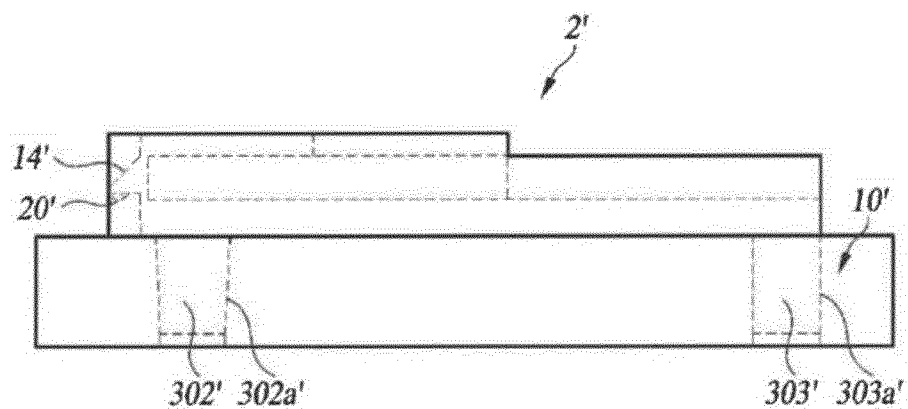
Figure 12A:
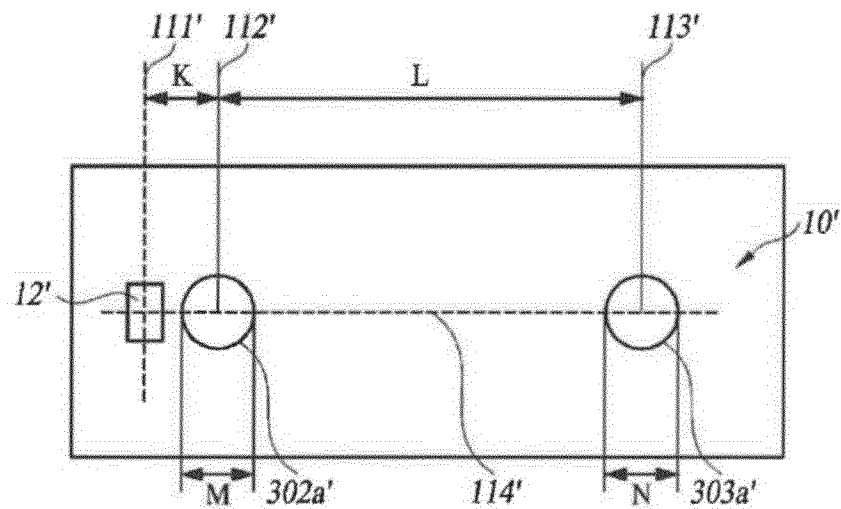
Figure 12B:
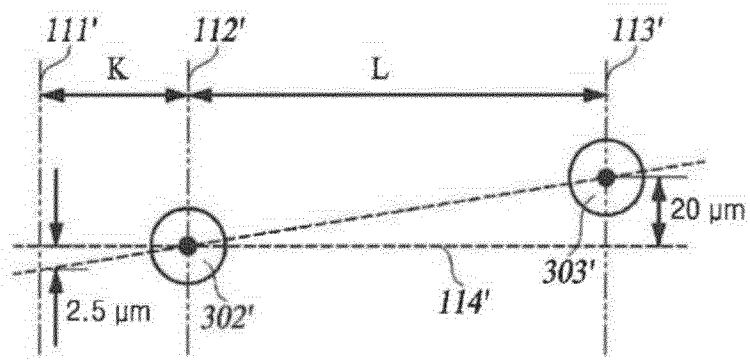
Figure 12C:
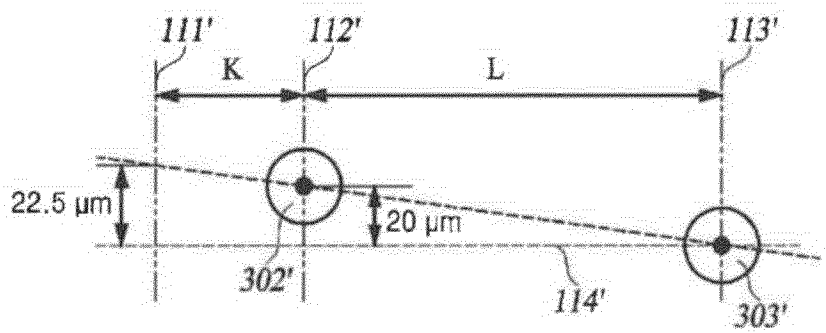

FIG. 12C is a diagram of the principle of the method illustrating the second post 303' is fixed immovably. It is assumed that K:L=1:8 and the first post 302' is located deflected upward by 20 μm from the center of the first reference hole 302a'. In this case, the lens 20' is deviated from the photodetector 12' upwardly by 22.5 μm by proportional expression.

Therefore, when the photodetector 12' is arranged outside of all the reference holes, fixing the first post 302' in proximity to the photodetector 12' can eventually reduce the nine-fold error than when the second post 303' is fixed. The above principle is applied not only to the case where the post deviates to the upward direction from the center of the reference hole but also to the case where the post deviates in the downward or left/right direction.

Those skilled in the art will appreciate that assembly errors can be minimized as the proportional relationship of K:L increases, that is, as the distance between posts increases or the first post is closer to the light source or the first lens.

In order to fix the first post 302' to the first reference hole 302a', the optical receiving device 1' of some embodiments of the present disclosure has the first post 302' designed as a tapered column so that it is inserted into the first reference hole 302a' initially with minute degrees of clearance provided, and as the insertion gradually progresses, the first post 302' is fixed at a position where it is in contact with the first reference hole 302a' without gaps.

The fixed position may be a point where the diameters of the first post 302' and the first reference hole 302a' coincide. However, since the post is molded with, for example, a plastic material, it has a property that, when depressed, it is inserted by being compressed and deformed, and when pressure is released, returns to the original shape by elastic restoring force. Therefore, the fixed position may be a position where the diameter of the first post 302' is slightly larger than that of the first reference hole 302a', which is a margin for facilitating the fixation of the first post 302'.

From the above, one can see that it is desirable to design the first post 302' as a tapered column having its diameter continuously vary increasing from a range larger than the diameter of the first reference hole 302a' to a range smaller than the same.

Once the position of the first post 302' is fixed, only the position of the second post 303' affects the alignment of the light source and the lens, but the latter effect is very small compared to the effect on the lens by the deviation of either the first post 302' or both posts 302', 303' from the centers of all the reference holes. Therefore, it becomes possible to restrict the alignment error of the light source and the lens to within a few micrometers to achieve the sub-miniaturization thereof.

Although exemplary embodiments of the present disclosure have been described for illustrative purposes, those skilled in the art will appreciate that various modifications, additions and substitutions are possible, without departing from the idea and scope of the claimed invention. The scope of the technical idea of the present embodiments is not limited by particular illustrations. Accordingly, one of ordinary skill would understand the scope of the claimed invention is not to be limited by the explicitly described above embodiments but by the claims and equivalents thereof.

The invention claimed is:

1. An optical transmitting device, comprising:
   a first lens configured to collimate a light from a light source;
   a reflector disposed above and in alignment with the first lens and configured to reflect the collimated light from the first lens;
   a second lens disposed on a side of and in alignment with the reflector and configured to transmit the reflected light to an optical fiber; and
   a housing configured to house the first lens, the second lens, and the reflector,
   wherein:
   the housing has a divided structure composed of a body at a lower position and a cover at an upper position;
   the first lens and the reflector are mounted to the body, the body includes a reflector mount configured to mount the reflector and a first lens mount configured to mount the first lens;
   the second lens is mounted to the cover, the cover includes a second lens mount configured to mount the second lens;
   the first lens is a collimating lens and the second lens is a focusing lens;
   the housing has a height less than 1 mm;
   the reflector mount stands vertically from a bottom of the body, and the first lens mount is spaced apart from the reflector mount by a predetermined distance and is formed in front of the reflector mount, extending from the bottom upward and then forward laterally;
   the first lens is installed on an upper surface of the first lens mount with a convex surface of the first lens facing downward, and the reflector is obliquely installed across an end of the upper surface and an apex of the reflector mount;
   the body comprises a left body side coupling portion and a right body side coupling portion, each extending from forwardly of the bottom to near a middle region of the body, the left body side coupling portion and the right body side coupling portion being symmetrical in structure, and respectively including one or more flaps, one or more receiving holes and one or more latch members;
   the flaps extend vertically upward from the bottom to provide a protective frame for protecting at least the first lens and the reflector laterally from the outside; and
   the bottom has an open space behind the left body side coupling portion and the right body side coupling portion, which cooperates with the cover so as to provide a space through which an optical fiber passes.

2. The optical transmitting device of claim 1, wherein the cover is formed with a hole for injecting epoxy resin or refractive index matching oil.

3. The optical transmitting device of claim 1, wherein the second lens mount extends vertically downward from an upper surface of the cover, and the second lens is installed on a front surface of the second lens mount.

4. The optical transmitting device of claim 1, wherein the cover includes an upper side formed with a left cover side coupling portion and a right cover side coupling portion corresponding to the left body side coupling portion and the right body side coupling portion, the left cover side coupling portion and the right cover side coupling portion being symmetrical in structure, and respectively including one or more flaps, one or more receiving holes and one or more latch members.

5. The optical transmitting device of claim 1, wherein the housing comprises a first post and a second post installed extending downward at predetermined front and rear positions in the bottom, respectively.

6. The optical transmitting device of claim 5, wherein the first post and the second post are circular columns.

7. The optical transmitting device of claim 6, wherein the first post is a tapered column whose diameter decreases gradually downward by minute degrees, and the second post is a straight column having a constant diameter.

8. The optical transmitting device of claim 7, wherein the first post has the diameter larger than that of the second post near the bottom of the body.

9. The optical transmitting device of claim 1, wherein the second lens is installed at a predetermined position to fully accommodate the reflected light.

* * * * *

UNITED STATES PATENT AND TRADEMARK OFFICE
CERTIFICATE OF CORRECTION

PATENT NO. : 10,268,007 B2  
APPLICATION NO. : 16/008774  
DATED : April 23, 2019  
INVENTOR(S) : Son et al.

It is certified that error appears in the above-identified patent and that said Letters Patent is hereby corrected as shown below:

Please delete Pat. No. 10,268,007 B2 in its entirety and insert Pat. No. 10,268,007 B2 in its entirety as shown on the attached pages.

Signed and Sealed this  
Seventh Day of July, 2020

Andrei Iancu  
*Director of the United States Patent and Trademark Office*

(12) United States Patent
Son et al.

(10) Patent No.: US 10,268,007 B2
(45) Date of Patent: Apr. 23, 2019

(54) OPTICAL TRANSMITTING DEVICE INCLUDING FIRST LENS AND REFLECTOR MOUNTED TO HOUSING BODY AND SECOND LENS MOUNTED TO HOUSING COVER

(71) Applicant: OPTOMIND INC., Suwon-si (KR)

(72) Inventors: Yung-sung Son, Yongin (KR); Bong-cheol Kim, Seoul (KR); Sang-shin Lee, Seoul (KR); Yong-geon Lee, Seoul (KR)

(73) Assignee: OPTOMIND INC. (KR)

( * ) Notice: Subject to any disclaimer, the term of this patent is extended or adjusted under 35 U.S.C. 154(b) by 0 days.

(21) Appl. No.: 16/008,774

(22) Filed: Jun. 14, 2018

(65) Prior Publication Data
US 2018/0299630 A1   Oct. 18, 2018

Related U.S. Application Data

(63) Continuation of application No. PCT/KR2016/014737, filed on Dec. 15, 2016.

(30) Foreign Application Priority Data

Dec. 15, 2015 (KR) .................... 10-2015-0179014
Dec. 15, 2015 (KR) .................... 10-2015-0179030

(51) Int. Cl.
G02B 6/42    (2006.01)
H04B 10/50   (2013.01)
(Continued)

(52) U.S. Cl.
CPC ......... *G02B 6/4261* (2013.01); *G02B 6/42* (2013.01); *G02B 6/4214* (2013.01); *G02B 6/4244* (2013.01); *G02B 6/4255* (2013.01); *H04B 10/50* (2013.01); *H04B 10/60* (2013.01); *H04B 10/80* (2013.01); *G02B 6/4253* (2013.01)

(58) Field of Classification Search
CPC .. G02B 6/4261; G02B 6/4214; G02B 6/4244; G02B 6/4255; G02B 6/4253; H04B 10/50
See application file for complete search history.

(56) References Cited

U.S. PATENT DOCUMENTS 8,575,529 B2 * 11/2013 Asahi ................ G02B 6/4201
                                                        250/205
9,103,984 B2 * 8/2015 Son .................... G02B 6/4214
(Continued)

FOREIGN PATENT DOCUMENTS

JP   1998-167749     6/1998
JP   2008158473 A    7/2008
(Continued)

*Primary Examiner* — Akm E Ullah
(74) *Attorney, Agent, or Firm* — Harness, Dickey & Pierce, P.L.C.

(57) ABSTRACT

Embodiments according to the present disclosure relate to an optical transmitting device and an optical receiving device which can minimize the alignment error between the light source and the photodetector on the substrate, miniaturize the devices, and require no separate guide member reducing manufacturing costs, while satisfying the design requirements for sub-miniaturization, and performing optical transmission and reception more efficiently.

9 Claims, 13 Drawing Sheets

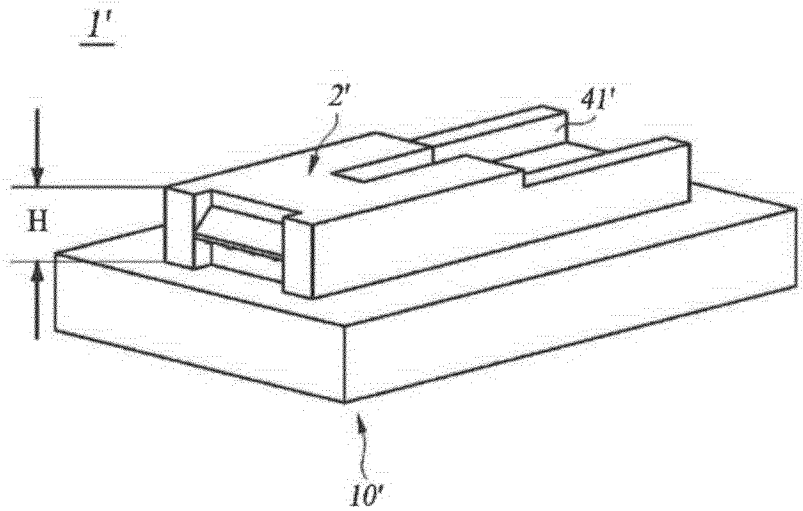

(51) Int. Cl.
H04B 10/60 (2013.01)
H04B 10/80 (2013.01)

(56) References Cited

U.S. PATENT DOCUMENTS

| | | | | |
|---|---|---|---|---|
| 9,507,105 | B2* | 11/2016 | Son | G02B 6/4214 |
| 9,632,262 | B2* | 4/2017 | Aihara | G02B 6/32 |
| 9,645,331 | B1* | 5/2017 | Kim | G02B 6/4243 |
| 9,739,957 | B2* | 8/2017 | Son | G02B 6/4214 |
| 2004/0022487 | A1* | 2/2004 | Nagasaka | G02B 6/4204 |
| | | | | 385/31 |
| 2011/0123151 | A1* | 5/2011 | Zbinden | G02B 6/4214 |
| | | | | 385/33 |
| 2014/0346323 | A1* | 11/2014 | Fujimura | G01J 1/44 |
| | | | | 250/208.2 |

FOREIGN PATENT DOCUMENTS

| | | |
|---|---|---|
| JP | 2013-235243 A | 11/2013 |
| KR | 20090040365 A | 4/2009 |
| KR | 20120029673 A | 3/2012 |
| KR | 10-1502318 B1 | 3/2015 |
| KR | 20160064540 A | 6/2016 |

\* cited by examiner

OPTICAL TRANSMITTING DEVICE INCLUDING FIRST LENS AND REFLECTOR MOUNTED TO HOUSING BODY AND SECOND LENS MOUNTED TO HOUSING COVER

CROSS-REFERENCE TO RELATED APPLICATIONS

The present application is a continuation of International Application No. PCT/KR2016/014737, filed Dec. 15, 2016, which is based upon and claims the benefit of priorities from Korean Patent Application Nos. 10-2015-0179014 and 10-2015-0179030, both filed on Dec. 15, 2015. The disclosures of the above-listed applications are hereby incorporated by reference herein in their entireties.

BACKGROUND OF THE INVENTION

Technical Field

The present disclosure in some embodiments relates to an optical transmitting device and an optical receiving device for an optical fiber cable and a method of aligning thereof.

Discussion

The statements in this section merely provide background information related to the present disclosure and do not necessarily constitute prior art.

Optical fiber-based signal transmission methods, which are in extensive use for a long haul communication, have widespread applications in a large-capacity digital media transmission including a high-definition digital video display for which high-speed and high-density data transmission is required, owing to the operation characteristics unaffected by an electromagnetic interference (EMI) and usefulness in a broad bandwidth of the optical fiber.

These optical fiber-based signal transmission methods can be implemented by arranging a lens and a reflector configured between an optical fiber and an optical element. One possible way to achieve such configuration is to install the optical fiber and a structure affixed with the reflector and the lens on a substrate mounted with the optical element to establish an optical alignment.

This method of optical alignment can be incorporated into manufacturing an optical transceiver, where a selected way of aligning the optical element, the lens, the reflector and the optical fiber dictates the structural simplification, manufacturing cost reduction, and durability and precision enhancements, etc., which exhibits the paramount significance of the optical alignment issue.

However, an optical transceiver manufactured by the optical alignment of the conventional method is not only highly costly but also too bulky to fit in a mobile communication device such as a smartphone, and is troubled with instability issues due to a complicated structure.

Figure 1B:
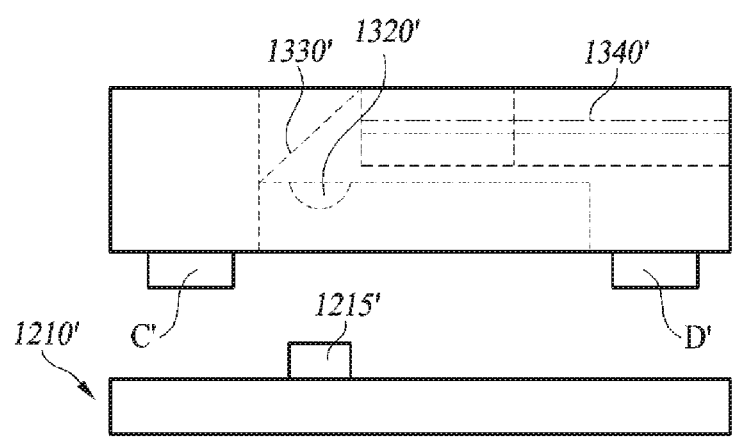
FIG. 1B is a side view of FIG. 1A.

Korean Patent Application No. 2014-0168272 filed on Nov. 28, 2014 by this applicant proposed an apparatus for optical transmitting and receiving as shown in FIGS. 1A and 1B.

The apparatus for optical transmitting and receiving or optical transmitting and receiving device includes a baseplate 1210' and an optical-fiber fixing block 1300'. The baseplate 1210' includes a set position for mounting an optical element 1215', a first reference hole A', and a second reference hole B' spaced by a first distance from the first reference hole A'. The optical-fiber fixing block 1300' is configured to fixedly mount at least one of a lens unit 1320' and an optical fiber 1340' optically linked with the optical element 1215', and it includes a first post C' configured to be inserted into the first reference hole A' and a second post D' configured to be inserted into the second reference hole B'.

The optical fiber 1340' is inserted along guide surfaces 1310'. The optical element 1215' and the lens unit 1320' are arranged so that their centers are vertically aligned, and a reflector 1330' is installed on the upper part of the lens unit 1320'. Light emitted from the optical fiber 1340' is deflected via the reflector 1330', focused via the lens unit 1320' and thereby made incident on the optical element 1215'. Conversely, light emitted from the optical element 1215' is focused via the lens unit 1320' and deflected via the reflector 1330' such that the light is incident on the optical fiber 1340'.

Such an optical transmitting and receiving device exhibits excellent efficiency serving the two individual purposes of transmission/reception, but has the following drawbacks.

Recent embedded system specifications require that the overall height of the optical transmitting and receiving device be 1 mm or less to fit the standard IC package. The main issue in designing and manufacturing in accordance with this requirement is that reducing the diameter or thickness of the lens unit has its light concentration ratio dropped correspondingly to inhibit a designed performance of the optical transmission and reception. In addition, reducing the external dimension of the device with the size of the lens unit maintained causes an optical loss at the reflector and an increased refraction angle of the light incident on the optical fiber to inhibit a part of the light from being guided through the optical fiber, resulting in structural misalignment of the optical system.

Here, the present inventors have determined that there is a limit to fulfilling a new specification with an existing device that performs both transmission and reception of light, and found that an optical transmitting device dedicated advantageously to optical transmissions can satisfy design requirements for sub-miniaturization as well as transmit light more efficiently.

At the same time, the present inventors have found an improved method of aligning the lens of the optical transmitting device and the light source on a substrate.

SUMMARY OF THE INVENTION

The following description of some embodiments of the present disclosure is based on these findings.

Therefore, the first and second embodiments of the present disclosure seek to provide an optical transmitting device and an optical receiving device respectively suitable for the design requirements for sub-miniaturization.

The first and second embodiments provide new types of optical transmitting and receiving devices to reduce the tolerance as well as the size of the devices which are economical, convenient to manufacture and so on.

The first and second embodiments further seek to provide aligning methods capable of limiting the alignment error between the optical transmitting and receiving devices and the substrates to within a few micrometers and minimizing the error.

Technical problems to be solved by the present disclosure are not limited to the above, but other unmentioned technical problems resolved will be clearly understood by a person of ordinary skill in the pertinent art from the description below.

According to one aspect of the first embodiment of the present disclosure, an optical transmitting device is provided including a first lens, a reflector disposed above and in alignment with the first lens, a second lens disposed on a side of and in alignment with the reflector so as to receive light reflected by the reflector, and a housing configured to house the first lens, the second lens, and the reflector. Here, the housing has a divided structure composed of a body at a lower position and a cover at an upper position, and the housing has a height less than 1 mm.

According to another aspect of the first embodiment, a method of aligning the optical transmitting device is provided including providing a substrate coupled to the optical transmitting device and including a light source, and coupling a first post to a first reference hole provided in the substrate, and coupling a second post to a second reference hole provided in the substrate, and aligning a first lens provided in the optical transmitting device with the light source of the substrate.

According to one aspect of the second embodiment, an optical receiving device.

The optical receiving device includes a focusing lens, a reflector disposed above and in alignment with the focusing lens, and a housing configured to house the focusing lens and the reflector. Here, the housing has a height less than 1 mm, and the housing has a bottom provided with a first post and a second post extending downward at predetermined front and rear positions of the bottom, respectively.

According to another aspect of the second embodiment, a method of aligning an optical receiving device is provided, including providing a substrate coupled to the optical receiving device and including a photodetector, and coupling a first post to a first reference hole provided in the substrate, and coupling a second post to a second reference hole provided in the substrate, and aligning a focusing lens provided in the optical receiving device with the photodetector of the substrate.

According to yet another embodiment of the present disclosure, an optical transmitting device includes a body and a cover. The body includes a first lens configured to modify a diverging beam of light emitted from a light source into a parallel beam of light, and a reflector arranged above the first lens and configured to reflect light from the first lens. The cover is configured to be coupled with the body to form a housing and it includes a second lens configured to collect the light from the reflector and transmit the light to an optical fiber, and an optical fiber guide unit configured to guide the optical fiber. Here, the second lens is installed at a predetermined position to fully accommodate the light reflected by the reflector and to establish a seamless optical path running from the light source through the first lens, the reflector and the second lens to the optical fiber.

According to yet another embodiment of the present disclosure, an optical communication assembly includes a body, a cover and a substrate. The body includes a collimating lens configured to modify a diverging beam of light emitted from a light source into a parallel beam of light, and a reflector arranged above the collimating lens and configured to reflect light from the collimating lens. The cover is configured to be coupled with the body to form a housing and it includes a focusing lens configured to collect the light from the reflector and transmit the light to an optical fiber, and an optical fiber guide unit configured to guide the optical fiber. The substrate is configured to be coupled to the light source and the body. Here, the focusing lens is installed at a predetermined position to fully accommodate the light reflected by the reflector and to establish a seamless optical path running from the light source through the collimating lens, the reflector and the focusing lens to the optical fiber.

The body comprises a first post and a second post installed extending downward at predetermined front and rear positions in a bottom of the body. The substrate comprises a first reference hole and a second reference hole configured to be coupled with the first post and the second post, respectively.

According to the first embodiment, by utilizing a lens group including a plurality of lenses, an optical transmitter is provided that can function as an optical transmitting device while satisfying the design requirements for sub-miniaturization, and can perform optical transmission more efficiently.

According to the second embodiment, an optical receiving device is provided that can function as an optical receiver while satisfying the design requirements for sub-miniaturization, and can perform optical reception more efficiently.

Further, the optical transmitting device according to the present alignment method minimizes the alignment error with a light source on the substrate, provides for the miniaturization thereof, and obviates the need for a separate guide member so as to reduce the manufacturing cost of the device.

Further, the optical receiving device according to the present alignment method minimizes the alignment error with a photodetector on the substrate, provides for the miniaturization thereof, and obviates the need for a separate guide member so as to reduce the manufacturing cost of the device.

Besides, different embodiments of the present disclosure exhibit a variety of corresponding effects such as the devices with excellent durability, which will be clearly illustrated by the embodiments described below.

BRIEF DESCRIPTION OF THE DRAWINGS

FIG. 1A is a perspective view of a conventional apparatus for transmitting and receiving light.

FIG. 1B is a side view of FIG. 1A.

FIG. 2 is a conceptual diagram for illustrating the principle of optical transmission of an optical transmitting device according to a first embodiment.

FIG. 3 is a perspective view of the overall appearance of the optical transmitting device of the first embodiment.

FIGS. 4A and 4B are a left side view and a plan view of the body of the optical transmitting device of the first embodiment.

FIGS. 5A and 5B are a left side view and a plan view of a cover of the optical transmitting device of the first embodiment.

FIGS. 6A and 6B are a left side view and a plan view illustrating that a housing made of the body and the cover of the first embodiment is coupled with a substrate.

FIGS. 7A to 7C are conceptual diagrams illustrating a method of aligning the optical transmitting device according to the first embodiment on a substrate, of which FIG. 7B is a diagram of the principle of the method where a first post is fixed, and FIG. 7C is a diagram of the principle of the method illustrating a second post is fixed.

FIG. 8 is a conceptual diagram illustrating the principle of optical reception of the optical receiving device according to the second embodiment.

FIG. 9 is a perspective view of the overall appearance of the optical receiving device of the second embodiment.

FIGS. 10A and 10B are a left side view and a plan view of the optical receiving device of the second embodiment.

FIG. 11 is a left side view illustrating that the housing of the second embodiment is coupled to the substrate.

FIGS. 12A to 12C are conceptual diagrams illustrating a method of aligning the optical receiving device according to the second embodiment on a substrate, of which FIG. 12B is a diagram of the principle of the method where the first post is fixed, and FIG. 12C is a diagram of the principle of the method illustrating a second post is fixed.

DESCRIPTION OF THE PREFERRED EMBODIMENTS

Hereinafter, some embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless specifically stated to the contrary.

If any component is described as 'connected', 'coupled' or 'fastened' to another component, the components are not only meant to be directly 'connected', 'coupled', or 'fastened' but also are indirectly 'connected', 'coupled', or 'fastened' via one or more additional components.

In addition, the size, shape, etc. of the components illustrated in the drawings can be exaggerated for clarity of explanation and convenience. The terms specifically defined in consideration of the configuration and operation of the present disclosure are only for explaining some embodiments of the present disclosure and are not intended to limit the scope of the present disclosure.

The transmission/reception apparatus for an optical fiber cable, according to some embodiments of the present disclosure may be manufactured as two different modules. One module is a transmitting device that performs an electric-optical signal conversion and transmits the converted optical signal via an external optical fiber cable. The other module is a receiving device that receives an optical signal via an external optical fiber cable and performs an optical-electric signal conversion. A transmitting device for an optical fiber cable according to at least one embodiment of the present disclosure will be described in the first embodiment, and a receiving device for an optical fiber cable will be described in a second embodiment.

Hereinafter, the principle, structure and then alignment method of an optical transmitting device 1 presented as the first embodiment of the present disclosure will be explained.

1. Principle of Optical Transmission

First, referring to FIG. 2, the principle of optical transmission will be described concentrating on the optical structure of the optical transmitting device 1 of the first embodiment of the present disclosure.

The optical transmitting device 1 faces a substrate 10 installed with a light source 12 as an optical element, and includes a lens group 20, a reflector 14 and an optical cable 30. The lens group 20 has a first lens 22 installed between the light source 12 and the reflector 14, and a second lens 24 installed between the reflector 14 and the optical cable. An optical fiber 32 is inserted in the optical cable 30. The reflector 14 includes, but is not limited to, a prism.

The light source 12, the first lens 22 and the reflector 14 are aligned so that the centers of the three members are aligned in the vertical direction. Likewise, the reflector 14, the second lens 24 and the optical cable 30 are laterally aligned so that the centers of the reflector 14 and the second lens 24 coincide with the center point of the light receiving portion of the optical cable 30. Methods for aligning the light source 12 and the first lens 22 are disclosed in applicant's earlier Korean Patent Application Nos. 2014-0168272 and 2013-0146599, which are hereby incorporated by reference into the contents of this application.

The first lens 22 is preferably a collimating lens and the second lens 24 is preferably a focusing lens. Light that has passed through a collimating lens becomes collimated light, and light that has passed through a focusing lens is focused. Therefore, as shown in the drawing, the light emitted from the light source 12 is collimated by passing through the first lens 22, propagates towards the reflector 14, is reflected by the reflector 14, travels towards and passes through the second lens 24, and then coupled into the core of the optical fiber 32 where the light is focused.

Multiples of the light source 12 may be aligned in a row on the substrate. In this case, multiple first lenses 22 and second lenses 24 are installed in a row in alignment with the respective light sources 12.

The adoption of the lens group 20 including the plurality of lenses of the first lens 22 and the second lens 24 is a feature of some embodiment of the present disclosure. Maintaining a single-lens structure with only a focusing lens displaced between a light source and a reflector while meeting the design requirement for sub-miniaturization of a submillimeter height limit leads to a reduced size of the lens and a shortened optical path, particularly where light needs to propagate through its micro heights. Thereby, the light emitted from the light source fails to gather accurately on the reflector, and part of the light reflected by the reflector is incident on the optical fiber at an angle with the fiber axis exceeding the fiber's total reflection critical angle to disable its propagation through the optical fiber, resulting in an optical loss with the light scattering outside the fiber cladding. To the contrary, with the adoption of the lens group 20 made of the plurality of lenses including the first lens 22 and the second lens 24, the optical transmitting device 1 of some embodiments of the present disclosure functions exclusively as an optical transmitter different from the conventional optical apparatus for both transmission and reception operations. At the same time, the optical transmitting device 1 satisfies the design requirements for sub-miniaturization, and performs optical transmission more efficiently.

The main function of the first lens 22 is to reduce the beam divergence of light emitted from the light source 12, to alleviate the burden of the second lens 24 with the duty to focus the light and at the same time to increase the optical alignment tolerance. The distributed duties between the lens with respect to the coupling of the optical signal reduces the influence of the numerical aperture (NA) which is a constraint of the optical waveguide of the optical fiber. This means that the refractivity of the lens can be adjusted according to the divergence of the light. In particular, using the second lens 24 to focus the collimated beam of light from the first lens 22 facilitates to maximally focus the light into the optical fiber that has a predetermined NA.

2. Structure of Optical Transmitting Device

FIG. 3 is a perspective view of the overall appearance of the optical transmitting device 1 including the structure of FIG. 2 of the present disclosure.

The optical transmitting device 1 includes a housing 2 in which the lens group 20 and the reflector 14 are installed. The optical transmitting device 1 is coupled face-to-face to the substrate 10 on which the light source 12 is installed.

The housing 2 is approximately quadrangular and has a divided structure of a body 3 and a cover 4. The cover 4 has its upper surface provided with a hole 40 for injecting an adhesive such as epoxy, and has at its rear a trapezoidal cut to provide a guide 41 for the optical cable 30.

The height (H) of the housing 2 is on a sub-millimeter, or sub-miniature, scale. This is a smaller thickness than a typical electronic chip, and the optical transmitting device 1 of some embodiments of the present disclosure is useful for application to devices with small thickness or small form factor.

The optical transmitting device 1 of some embodiments has a molded article for optical alignment removed, and it is suffice to perform the optical alignment with the housing 2 and the substrate 10 themselves and thereby reduces the alignment error generated by using the molded article. The housing 2 is manufactured by plastic injection molding to facilitate mass production and assembly thereof.

FIGS. 4A and 4B are a left side view and a plan view of the body 3 of the optical transmitting device 1.

The body 3 has a bottom 300 of a long rectangle, a left side coupling portion 310 and a right side coupling portion 312, each having a height larger than the bottom 300 and extending from near the front of the tip of the bottom 300 to near a middle region thereof. The bottom 300 is centrally positioned and enclosed by the left coupling portion 310 and the right coupling portion 312 from both sides. Starting from the front to the rear, the left coupling portion 310 includes a first flap 315 projecting upward, a first receiving hole 313 and a first latch member 316 projecting upward. Likewise, the right coupling portion 312 includes a second flap 317, a second receiving hole 314 and a second latch member 318 projecting upward. Generally, the left coupling portion 310 and the right coupling portion 312 are symmetrical structures of the same shape.

The first flap 315 and the second flap 317 extend vertically upward from the bottom 300, and protect the first lens 24 and the reflector 14 from the left and right, respectively. The latch members 316, 318 and the receiving holes 313, 314 are members to be coupled with corresponding elements of the cover 4. In this arrangement, the left coupling portion 310 and the right coupling portion 312 provide a protective frame for the lens and the reflector and provide a fastening structure for cooperating with the cover 4. Therefore, as long as their functions are offered, the above members may have their size, shape and position arbitrarily changed.

The bottom 300 and the coupling portions 310, 312 may be integrated with one another, although their formation is not necessarily limited thereto.

The bottom 300 has an open space 300S behind the left and right coupling portions 310, 312, which cooperates with the cover 4 so as to provide a space through which the optical fiber passes. This optical fiber space is closed by the cover 4 at its third flap 403 and fourth flap 408 described below to provide an optical fiber guiding structure which is impervious to external impacts and vibrations.

The bottom 300 is formed with a first post 302 and a second post 303 in predetermined positions forward and rearward respectively along the longitudinal center line thereof, which extend downward toward the substrate. The first post 302 and the second post 303 are circular columns protruding downward. In the example shown in FIG. 4A, in order to tolerate the error of optical alignment, the first post 302 is a tapered column having its diameter gradually reduced downward by minute degrees, and the second post 303 is a straight column having a constant diameter. The diameter of the first post 302 is larger than that of the second post 303 in the vicinity of the top of the first post 302, that is, adjacent to the bottom 300. This means that with respect to the second post 303, the diameter of the first post 302 may be larger on its upper side of a reference point in the vertical direction and smaller on its lower side of the reference point.

Then, the body 3 of some embodiments of the present disclosure utilizes a reflector mount 301 and a first lens mount 304 for installing the reflector 14 and the first lens 22, respectively. As shown in FIG. 4A, the reflector mount 301 rises vertically from the tip of the bottom 300. The first lens mount 304 is spaced apart from the reflector mount 301 by a predetermined distance and is formed in front of the reflector mount 301, and it extends from a lower end portion of the bottom 300 to a height slightly higher than the start point of the reflector mount 301 until it is redirected to extend forward laterally to generally form an inverted L-shape. The reflector mount 301 and the first lens mount 304 may be made to be integrated with the bottom 300 or they may be separately manufactured in a unitized module and coupled to the bottom 300.

The first lens 22 is installed on an upper surface 304a of the first lens mount 304 with its convex surface facing downward. The reflector 14 is obliquely installed across the end of the upper surface 304a and the apex of the reflector mount 301. When multiples of the first lens 22 are installed, as shown in FIG. 4B, the first lenses 22 are installed in a row along the upper surface 304a with a certain interval therebetween. In this case, the reflector 14 may be a single prism installed for providing a constant reflecting surface.

As long as the reflector mount 301 and the first lens mount 304 perform the optical transmission function described with reference to FIG. 2 and serve to house the first lens 22 and the reflector 14 so as to provide an optical path suitable for the optical transmitting device 1 of some embodiments of the present disclosure, they may be freely modified in shape, size and position.

As described above, the present disclosure in some embodiments adopts a divided structure wherein the first lens 22 and the reflector 14 are installed in the body 3, and the second lens 24 is installed in the cover 4, which facilitates designing and manufacturing of a suitable compact optical transmitting device for sub-miniaturization requirements.

FIGS. 5A and 5B are a left side view and a plan view of the cover 4 of the optical transmitting device 1.

The cover 4 has an elongated rectangular shape and includes an upper side 400 wider than the bottom 300. On the lower part of the upper side 400, a left coupling portion 420 is formed to correspond to the left side contour of the body 3 and a right coupling portion 430 is formed to correspond to the right side contour of the body 3. Starting from the front to the rear, the left coupling portion 420 includes a third latch member 401 projecting downward, a third receiving hole 402, and a third flap 403 projecting downward. Similarly, the right coupling portion 430 includes a fourth latch member 406 projecting downward, a fourth receiving hole 407, and a fourth flap 408 projecting downward from the front.

As long as the left coupling portion 420 and the right coupling portion 430 serve the purpose of providing a protection frame of the optical fiber cable and fastening with corresponding elements of the body 3, they may be arbitrarily modified in size, shape and position. In some embodiments, the upper side 400 and these coupling portions 420, 430 are integrated, but are not necessarily limited thereto.

As described above, the upper side 400 is provided with the hole 40 for injecting an adhesive such as epoxy at the midpoint in the width direction in front of the upper side 400. The epoxy resin injected through the hole 40 securely binds the optical fiber and the cover 4 together, fills the gap between the wall surface of the second lens 24 and the optical fiber end in the coupling process, so as to reduce the reflection that may occur from the surface through which the light is transmitted. Some embodiments of the present disclosure inject, in addition to epoxy, other highly viscous materials enabling optical communication in cooperation with optical fibers and plastic molded parts. For example, as a replacement or addition to the epoxy, refractive index matching oil may be injected to desirably reduce the NA of the light incident on the optical fiber.

In some embodiments of the present disclosure, the cover 4 utilizes a second lens mount 404 for mounting the second lens 24. The second lens mount 404 extends vertically downward from the front portion of the upper surface 300, as shown in FIG. 5A. The second lens 24 is installed on a front surface 404a of the second lens mount 404. The second lens 24 is installed at an elevation set according to the position of the reflector 14 so as to fully accommodate the light reflected by the reflector 14. When there are multiples of the first lens 22, as shown in FIG. 5B, the matching number of second lenses 24 are installed.

The portion where the second lens 24 and the second lens mount 404 are installed remains in the cover 4 as an open space 40S which, however, is laterally closed by the first flap 315 and the second flap 317 to provide a structure of the lens system which is impervious to external impact and vibration.

As long as the second lens mount 404 serves its purpose of housing the second lens 24 described with reference to FIG. 2 so as to provide an optical path suitable for the optical transmitting device 1 of some embodiments of the present disclosure, it may be freely modified in shape, size and position.

As described above, the present disclosure in some embodiments adopts a divided structure between the body 3 and the cover 4, which facilitates designing and manufacturing of a suitable compact optical transmitting device for sub-miniaturization requirements.

In addition, relocating the second lens 24 installed on the cover 4 alone without adjustment of the body 3 may adjust the distance to the optical fiber or provide an alignment with the path of the reflected light from the reflector 14, which facilitates the operation of optical alignment and calibration.

FIGS. 6A and 6B are a left side view and a plan view illustrating that the housing 2 made of the body 3 and the cover 4 described above is coupled with the substrate 10. For convenience of explanation, FIG. 6A presents a reference numeral of each left side member, accompanied by its right side counterpart in parentheses.

The first flap 315 and the second flap 317 of the body 3 are fastened to the cover 4 so as to be in contact with the upper side 400 of the cover 4, to provide a protective frame for laterally protecting the optical system including the first lens 22, the reflector 14 and the second lens 24.

In the first receiving hole 313 and the second receiving hole 314 of the body 3, the third latch member 401 and the fourth latch member 406 of the cover 4 are accommodated, respectively. Additionally, in the third receiving hole 402 and the fourth receiving hole 407 of the cover 4, the first latch member 316 and the second latch member 318 of the body 3 are accommodated, respectively. Repetitive fastening of these continuous concavo-convex structures provides secure and accurate fastening of the body 3 and the cover 4, and it can minimize misalignment after assembly.

Further, the third flap 403 and the fourth flap 408 of the cover 4 are coupled with the body 3 abutting against the bottom 300 while closing the space 300s thereof so as to provide an optical fiber guiding structure which is impervious to external impacts or vibrations.

One of the structural features of the housing 2 of the optical transmitting device of some embodiments is that the body 3 is provided with the first lens 22 and the reflector 14 and the cover 4 has the second lens 24 and the optical fiber guide unit installed therein. Thus, while maintaining this feature, the present disclosure is capable of various modifications at the level of those skilled in the art, including, for example, providing the first flap and the second flap on the cover 4 with the third flap and the fourth flap provided on the body 3, or inversely forming the latch members and the receiving holes between the body 3 and the cover 4, or switching the order of forming the latch members and the receiving holes.

Further, although the explanation has been made on the premise that the light source 12 is arranged outside the first post 302 and the second post 303, the light source 12 when relocated halfway between the first post 302 and the second post 303 as disclosed in Korean Patent Application No. 2014-0168272 may be accommodated by the present disclosure with an appropriate adaptation of the housing structure.

Referring again to FIGS. 6A and 6B, the housing 2 of the present disclosure is coupled to the substrate 10.

The substrate 10 is formed with a first reference hole 302a and a second reference hole 303a for accommodating the first post 302 and the second post 303 of the housing 2. The first post 302 and the second post 303 are inserted into the first reference hole 302a and the second reference hole 303a, respectively. The first post 302 which is the tapered column is initially inserted into the first reference hole 302a with a minute clearance remaining therebetween. As the insertion progresses gradually, the first post 302 is fixed in a position where it comes into contact with the first reference hole 302a without gaps.

As described later, the optical transmitting device 1 of some embodiments having such coupling structure can minimize a misalignment that may occur in the process of assembling with the substrate 10.

3. Alignment Method of Optical Transmission Device

The principle of the alignment method of the optical transmitting device of the present disclosure will be described with reference to FIGS. 7A to 7C, which mainly shows the plan view of the substrate 10.

With respect to the light source 12 provided on the substrate 10, the first reference hole 302a and the second reference hole 303a are formed in a line. The light source 12, first reference hole 302a and second reference hole 303a respectively have center lines 111, 112 and 113 in the widthwise direction (vertical direction in the drawing), and the light source 12, first reference hole 302a and second reference hole 303a have a longitudinal (horizontal direction in the drawing) center line as indicated by 114. "A" is the gap between center line 111 and center line 112, and "B" is the spacing between center line 112 and center line 113.

In the small form factor optical transmitting device 1 with a height of less than 1 mm, correction of assembling tolerance means eliminating errors of several micrometers, so a sophisticated aligning operation is required. Typically, the substrate 10 is completed and supplied in advance according to specifications. The principal interest in the assembly of the substrate 10 and the optical transmitting device 1 is the alignment of the first lens 22 with the least possible deviation with respect to the light source 12 located on the substrate 10. The ideal assembly for this purpose provides a perfect alignment of the centers of the respective reference holes with the centers of the respective posts free of deviation of even several μm. However, it is difficult to make a complete intermeshing of members in the actual assembly process. A solution to this problem is to minimize the error by having either one of the first post 302 and the second post 303 fixed to eliminate the tolerance issue, and having the tolerance of the other post to exclusively affect the position of the first lens 22 to be aligned with the light source 12.

FIG. 7B is a diagram of the principle of the method where the first post 302 is fixed immovably. It is assumed that A:B=1:8 and the second post 303 is located deflected upward by 20 μm from the center of the second reference hole 303a. In this case, the first lens 22 is deviated from the light source 12 downwardly by 2.5 μm by proportional expression.

FIG. 7C is a diagram of the principle of the method illustrating the second post 303 is fixed immovably. It is assumed that A:B=1:8 and the first post 302 is located deflected upward by 20 μm from the center of the first reference hole 302a. In this case, the first lens 22 is deviated from the light source 12 upwardly by 22.5 μm by proportional expression.

Therefore, when the light source 12 is arranged outside with respect to all the reference holes, fixing the first post 302 in proximity to the light source 12 can eventually reduce the nine-fold error than when the second post 303 is fixed. The above principle is applied not only to the case where the post deviates to the upward direction from the center of the reference hole but also to the case where the post deviates in the downward or left/right direction.

Those skilled in the art will appreciate that assembly errors can be minimized as the proportional relationship of A:B increases, that is, as the distance between posts increases or the first post is closer to the light source or the first lens.

In order to fix the first post 302 to the first reference hole 302a, the optical transmitting device 1 of some embodiments of the present disclosure has the first post 302 designed as a tapered column so that it is inserted into the first reference hole 302a initially with minute degrees of clearance provided, and as the insertion gradually progresses, the first post 302 is fixed at a position where it is in contact with the first reference hole 302a without gaps.

The fixed position may be a point where the diameters of the first post 302 and the first reference hole 302a coincide. However, since the post is molded with, for example, a plastic material, it has a property that, when depressed, it is inserted by being compressed and deformed, and when pressure is released, returns to the original shape by elastic restoring force. Therefore, the fixed position may be a position where the diameter of the first post 302 is slightly larger than that of the first reference hole 302a, which is a margin for facilitating the fixation of the first post 302.

From the above, one can see that it is desirable to design the first post 302 as a tapered column having its diameter continuously increased from a range larger than the diameter of the first reference hole 302a to a range smaller than the same.

When the position of the first post 302 is fixed, only the position of the second post 303 affects the alignment of the light source and the lens, but the latter effect is very small compared to the effect on the lens by the deviation of either the first post 302 or both posts 302, 303 from the centers of all the reference holes. Therefore, it becomes possible to restrict the alignment error of the light source and the lens to within a few micrometers to minimize it.

The following describes the principle, structure and then the alignment method of an optical receiving device 1' presented as the second embodiment of the present disclosure.

1. Principle of Optical Reception

Referring first to FIG. 8, the principle of optical reception will be described concentrating on the optical structure of the optical receiving device 1' of the second embodiment of the present disclosure.

The light receiving device 1' according to some embodiments of the present disclosure faces a substrate 10 installed with a photodetector 12' as an optical receiving element, and includes a lens 20', a reflector 14' and an optical cable 30'. The lens 20' is provided between the photodetector 12' and the reflector 14'. An optical fiber 32' is inserted in the optical cable 30'. The reflector 14' includes, but is not limited to, a prism.

The photodetector 12', lens 20' and reflector 14' are aligned so that the centers of the three members are at the same elevation. Likewise, the reflector 14' and the optical cable 30 are laterally aligned so that both members are aligned such that the reflector 14' coincide with the center point of the light transmitting portion of the optical cable 30'.

The lens 20' is preferably a focusing lens. The light having passed through the focusing lens is focused. Therefore, as shown in the drawing, the light emitted from the optical fiber 32' is incident on the reflector 14', is reflected by the reflector 14' at right angle, travels downward in the drawing and passes through the lens 20' where the light is focused and then incident on the photodetector 12'.

Multiples of the photodetector 12' may be aligned in a row on the substrate. In this case, multiple lenses 20' are installed in a row in alignment with the respective photodetectors 12'.

It is very difficult to design an optical transceiver that performs both optical transmission and optical reception while satisfying the design requirements for sub-miniaturization of a submillimeter height limit. However, it has been found that the single-lens structure with the lens size reduced for use as an optical receiving device exhibits an excellent optical receiving efficiency over prior art. On the other hand, the optical transmitting device needs to adopt a lens group for transmitting light by focusing the same to the optical fiber at the precise point.

2. Structure of Optical Receiving Device

FIG. 9 is a perspective view of the overall appearance of the optical receiving device 1' including the structure of the optical receiving device of FIG. 8 according to some embodiments.

The optical receiving device 1' includes a housing 2' in which a lens 20' and a reflector 14' are installed. The optical receiving device 1' is coupled face-to-face to the substrate 10' on which the photodetector 12' is installed.

The height (H) of the housing 2' is on a sub-millimeter, or sub-miniature, scale. This is a smaller thickness than a typical electronic chip, and the optical receiving device 1' of some embodiments of the present disclosure is useful for application to devices with small thickness or small form factor.

The optical receiving device 1' of some embodiments has a molded article for optical alignment removed, and it is suffice to perform the optical alignment with the housing 2' and the substrate 10' themselves and thereby reduces the alignment error generated by using the molded article. The housing 2' is manufactured by plastic injection molding to facilitate mass production and assembly thereof.

The housing 2' has guide surfaces 41' adapted to guide the optical fiber 32' to the inner center of the housing 2'.

FIGS. 10A and 10B are a left side view and a plan view of the housing 2' of the optical receiving device 1'.

The optical fiber 32' which has passed through a space defined by the guide surfaces 41' of the housing 2' further passes through a space defined by central guide surfaces 411' into a position where it faces the reflector 14'. Under the reflector 14', four lenses 20' are arranged in a row along the width direction of the housing 2' in the illustrated example. This arrangement is advantageous in that flexibility and design freedom can be increased when, for example, multiples of the optical fiber 32' are disposed between the guide surfaces 41' or even if the position of any one of optical fibers 32' is somewhat misaligned because the light emitted from the optical fibers 32' can be deflected by the reflector 14' and directed to one of the lenses 20'.

The housing 2' has a bottom 200' formed with a first post 302' and a second post 303' in predetermined positions forward and rearward respectively along the longitudinal center line thereof, which extend downward toward the substrate. The first post 302' and the second post 303' are circular columns protruding downward. In the example shown in FIG. 10A, in order to tolerate the error of optical alignment, the first post 302' is a tapered column having its diameter gradually reduced downward by minute degrees, and the second post 303' is a straight column having a constant diameter. The diameter of the first post 302' is larger than that of the second post 303' in the vicinity of the top of the first post 302', that is, adjacent to the bottom 200'. This means that with respect to the second post 303', the diameter of the first post 302' may be larger on its upper side of a reference point in the vertical direction and smaller on its lower side of the reference point.

FIG. 11 is a left side view illustrating that the housing 2' is coupled to the substrate 10'.

The substrate 10' is formed with a first reference hole 302a' and a second reference hole 303a' for accommodating the first post 302' and the second post 303' of the housing 2'. The first post 302' and the second post 303' are inserted into the first reference hole 302a' and the second reference hole 303a', respectively. The first post 302' which is the tapered column is initially inserted in first reference hole 302a' with a minute clearance remaining therebetween. As the insertion progresses gradually, the first post 302' is fixed in a position where it comes into contact with the first reference hole 302a' without gaps.

As described later, the optical receiving device 1 of some embodiments having such coupling structure can minimize a misalignment that may occur in the process of assembling with the substrate 10'.

3. Method of Arranging Optical Receiving Device

The principle of the alignment method of the optical receiving device of the present disclosure will be described with reference to FIGS. 12A to 12C which mainly show the plan view of the substrate 10.

With respect to the photodetector 12' provided on the substrate 10', the first reference hole 302a' and the second reference hole 303a' are formed in a line. The photodetector 12', first reference hole 302a' and second reference hole 303a' respectively have center lines 111', 112' and 113' in the width direction (vertical direction in the drawing), and the photodetector 12', first reference hole 302a' and second reference hole 303a' have a longitudinal (horizontal direction in the drawing) center line as indicated by 114'. "K" is the gap between center line 111' and center line 112', and "L" is the spacing between center line 112' and center line 113'.

In the small form factor optical transmitting device 1' with a height of less than 1 mm, correction of assembling tolerance means eliminating errors of several micrometers, so a sophisticated aligning operation is required. Typically, the substrate 10' is completed and supplied in advance according to specifications. The principal interest in the assembly of the substrate 10' and the optical receiving device 1' is the alignment of the lens 20' with the least possible deviation with respect to the photodetector 12' located on the substrate 10'. The ideal assembly for this purpose provides a perfect alignment of the centers of the respective reference holes with the centers of the respective posts free of deviation of even several μm. However, it is difficult to make a complete intermeshing of members in the actual assembly process. A solution to this problem is to minimize the error by having either one of the first post 302' and the second post 303' fixed to eliminate the tolerance issue, and having the tolerance of the other post to exclusively affect the position of the lens 20' to be aligned with the photodetector 12'.

FIG. 12B is a diagram of the principle of the method where the first post 302' is fixed immovably. It is assumed that K:L=1:8 and the second post 303' is located deflected upward by 20 μm from the center of the second reference hole 303a'. In this case, the first lens 20' is deviated from the photodetector 12' downwardly by 2.5 μm by proportional expression.

FIG. 12C is a diagram of the principle of the method illustrating the second post 303' is fixed immovably. It is assumed that K:L=1:8 and the first post 302' is located deflected upward by 20 μm from the center of the first reference hole 302a'. In this case, the lens 20' is deviated from the photodetector 12' upwardly by 22.5 μm by proportional expression.

Therefore, when the photodetector 12' is arranged outside of all the reference holes, fixing the first post 302' in proximity to the photodetector 12' can eventually reduce the nine-fold error than when the second post 303' is fixed. The above principle is applied not only to the case where the post deviates to the upward direction from the center of the reference hole but also to the case where the post deviates in the downward or left/right direction.

Those skilled in the art will appreciate that assembly errors can be minimized as the proportional relationship of K:L increases, that is, as the distance between posts increases or the first post is closer to the light source or the first lens.

In order to fix the first post 302' to the first reference hole 302a', the optical receiving device 1' of some embodiments of the present disclosure has the first post 302' designed as a tapered column so that it is inserted into the first reference hole 302a' initially with minute degrees of clearance provided, and as the insertion gradually progresses, the first post 302' is fixed at a position where it is in contact with the first reference hole 302a' without gaps.

The fixed position may be a point where the diameters of the first post 302' and the first reference hole 302a' coincide. However, since the post is molded with, for example, a plastic material, it has a property that, when depressed, it is inserted by being compressed and deformed, and when pressure is released, returns to the original shape by elastic restoring force. Therefore, the fixed position may be a position where the diameter of the first post 302' is slightly larger than that of the first reference hole 302a', which is a margin for facilitating the fixation of the first post 302'.

From the above, one can see that it is desirable to design the first post 302' as a tapered column having its diameter continuously vary increasing from a range larger than the diameter of the first reference hole 302a' to a range smaller than the same.

Once the position of the first post 302' is fixed, only the position of the second post 303' affects the alignment of the light source and the lens, but the latter effect is very small compared to the effect on the lens by the deviation of either the first post 302' or both posts 302', 303' from the centers of all the reference holes. Therefore, it becomes possible to restrict the alignment error of the light source and the lens to within a few micrometers to achieve the sub-miniaturization thereof.

Although exemplary embodiments of the present disclosure have been described for illustrative purposes, those skilled in the art will appreciate that various modifications, additions and substitutions are possible, without departing from the idea and scope of the claimed invention. The scope of the technical idea of the present embodiments is not limited by particular illustrations. Accordingly, one of ordinary skill would understand that the scope of the claimed invention is not to be limited by the explicitly described above embodiments but by the claims and equivalents thereof.

The invention claimed is:

1. An optical transmitting device, comprising:
   a first lens configured to collimate a light from a light source;
   a reflector disposed above and in alignment with the first lens and configured to reflect the collimated light from the first lens;
   a second lens disposed on a side of and in alignment with the reflector and configured to transmit the reflected light to an optical fiber; and
   a housing configured to house the first lens, the second lens, and the reflector,
   wherein:
   the housing has a divided structure composed of a body at a lower position and a cover at an upper position;
   the first lens and the reflector are mounted to the body, the body includes a reflector mount configured to mount the reflector and a first lens mount configured to mount the first lens;
   the second lens is mounted to the cover, the cover includes a second lens mount configured to mount the second lens;
   the first lens is a collimating lens and the second lens is a focusing lens;
   the housing has a height less than 1 mm;
   the reflector mount stands vertically from a bottom of the body, and the first lens mount is spaced apart from the reflector mount by a predetermined distance and is formed in front of the reflector mount, extending from the bottom upward and then forward laterally;
   the first lens is installed on an upper surface of the first lens mount with a convex surface of the first lens facing downward, and the reflector is obliquely installed across an end of the upper surface and an apex of the reflector mount;
   the body comprises a left body side coupling portion and a right body side coupling portion, each extending from forwardly of the bottom to near a middle region of the body, the left body side coupling portion and the right body side coupling portion being symmetrical in structure, and respectively including one or more flaps, one or more receiving holes and one or more latch members;
   the flaps extend vertically upward from the bottom to provide a protective frame for protecting at least the first lens and the reflector laterally from the outside; and
   the bottom has an open space behind the left body side coupling portion and the right body side coupling portion, which cooperates with the cover so as to provide a space through which an optical fiber passes.

2. The optical transmitting device of claim 1, wherein the cover is formed with a hole for injecting epoxy resin or refractive index matching oil.

3. The optical transmitting device of claim 1, wherein the second lens mount extends vertically downward from an upper surface of the cover, and the second lens is installed on a front surface of the second lens mount.

4. The optical transmitting device of claim 1, wherein the cover includes an upper side formed with a left cover side coupling portion and a right cover side coupling portion corresponding to the left body side coupling portion and the right body side coupling portion, the left cover side coupling portion and the right cover side coupling portion being symmetrical in structure, and respectively including one or more flaps, one or more receiving holes and one or more latch members.

5. The optical transmitting device of claim 1, wherein the housing comprises a first post and a second post installed extending downward at predetermined front and rear positions in the bottom, respectively.

6. The optical transmitting device of claim 5, wherein the first post and the second post are circular columns.

7. The optical transmitting device of claim 6, wherein the first post is a tapered column whose diameter decreases gradually downward by minute degrees, and the second post is a straight column having a constant diameter.

8. The optical transmitting device of claim 7, wherein the first post has the diameter larger than that of the second post near the bottom of the body.

9. The optical transmitting device of claim 1, wherein the second lens is installed at a predetermined position to fully accommodate the reflected light.

* * * * *